US009331531B2

(12) United States Patent
Nadeau et al.

(10) Patent No.: US 9,331,531 B2
(45) Date of Patent: May 3, 2016

(54) METHOD OF MANUFACTURING A TRANSVERSE FLUX ELECTRICAL MACHINE ROTOR

(71) Applicant: EOCYCLE TECHNOLOGIES INC., Montreal (CA)

(72) Inventors: Raphael Nadeau, Verdun (CA); Daniel Massicotte, Quebec (CA); Eric Adams, Gaspe (CA); Simon Cote, Gaspe (CA); Patrice Fortin, Gaspe (CA); Jean-Francois Bernier-Synnott, Gaspe (CA)

(73) Assignee: EOCYCLE TECHNOLOGIES INC., Montreal (CA)

( * ) Notice: Subject to any disclaimer, the term of this patent is extended or adjusted under 35 U.S.C. 154(b) by 225 days.

(21) Appl. No.: 14/055,450

(22) Filed: Oct. 16, 2013

(65) Prior Publication Data

US 2014/0101927 A1  Apr. 17, 2014

Related U.S. Application Data

(60) Provisional application No. 61/714,869, filed on Oct. 17, 2012.

(51) Int. Cl.
| | |
|---|---|
| *H02K 1/20* | (2006.01) |
| *H02K 1/27* | (2006.01) |
| *H02K 15/03* | (2006.01) |
| *H02K 1/30* | (2006.01) |
| *H02K 21/14* | (2006.01) |

(52) U.S. Cl.
CPC ............... *H02K 1/27* (2013.01); *H02K 1/2773* (2013.01); *H02K 1/30* (2013.01); *H02K 15/03* (2013.01); *H02K 21/145* (2013.01); *Y10T 29/49012* (2015.01); *Y10T 156/1052* (2015.01)

(58) Field of Classification Search
CPC ......... H02K 1/27; H02K 1/2773; H02K 1/30; H02K 15/03; H02K 21/145; Y10T 29/49012; Y10T 156/1052
See application file for complete search history.

(56) References Cited

U.S. PATENT DOCUMENTS

| 3,680,671 A | 8/1972 | Searl |
| 3,710,158 A | 1/1973 | Bachle et al. |

(Continued)

FOREIGN PATENT DOCUMENTS

| EP | 1 005 136 | 5/2000 |
| EP | 1 063 754 | 6/2000 |

(Continued)

OTHER PUBLICATIONS

Project UpWind, Research Report Electromagnetic Optimization of Direct-drive generators; authors: Deok-je Bang, Henk Polinder ; Affiliation: Delft University of Technology (Netherlands) ; Oct. 19, 2010.

(Continued)

*Primary Examiner* — Carl Arbes
(74) *Attorney, Agent, or Firm* — Mathieu Audet

(57) ABSTRACT

A method of assembling a rotor portion adapted to be used in a rotatable transverse flux electrical machine (TFEM) is presented, the method comprising assembling at least one concentrator to a concentrator-receiving jig, applying bonding material between the concentrator and a magnet-and-concentrator supporting frame, assembling the concentrator-receiving jig to the magnet-and-concentrator supporting frame wherein a radial reference portion of the concentrator-receiving jig is material to set a distance between the concentrator assembled to the concentrator-receiving jig and the magnet-and-concentrator supporting frame, curing the bonding material to secure the concentrators to the magnet-and-concentrator supporting frame, and removing the concentrator-receiving jig without the at least one concentrator that remains secured to the magnet-and-concentrator supporting frame. A tool thereof is also encompassed by the present application.

17 Claims, 32 Drawing Sheets

(56) References Cited

U.S. PATENT DOCUMENTS

| | | | |
|---|---|---|---|
| 4,012,083 A | 3/1977 | Haberman et al. | |
| 4,318,019 A | 3/1982 | Teasley et al. | |
| 4,613,842 A | 9/1986 | Ichiyama et al. | |
| 4,707,630 A * | 11/1987 | Tomite | H02K 23/04 310/154.12 |
| 4,933,581 A | 6/1990 | Shramo | |
| 4,970,776 A | 11/1990 | Yamamoto et al. | |
| 5,176,946 A | 1/1993 | Wieloch | |
| 5,854,521 A | 12/1998 | Nolle | |
| 5,872,409 A | 2/1999 | Jung | |
| 6,051,904 A | 4/2000 | Akemakou | |
| 6,060,810 A | 5/2000 | Lee et al. | |
| 6,111,329 A | 8/2000 | Graham et al. | |
| 6,169,350 B1 | 1/2001 | Yang | |
| 6,255,754 B1 | 7/2001 | Savage et al. | |
| 6,568,065 B2 | 5/2003 | Graham et al. | |
| 6,664,704 B2 | 12/2003 | Calley | |
| 6,768,238 B2 | 7/2004 | Knauff et al. | |
| 6,841,908 B2 | 1/2005 | Hasegawa et al. | |
| 6,849,969 B2 | 2/2005 | Kang et al. | |
| 6,870,294 B2 | 3/2005 | Holzheu et al. | |
| 6,873,082 B2 | 3/2005 | Neet | |
| 6,888,272 B2 | 5/2005 | Kastinger | |
| 6,952,068 B2 | 10/2005 | Gieras et al. | |
| 6,979,925 B2 | 12/2005 | Schwamm | |
| 7,030,534 B2 | 4/2006 | Caamano | |
| 7,084,731 B2 | 8/2006 | Kubo | |
| 7,124,495 B2 | 10/2006 | Gieras et al. | |
| 7,164,220 B2 | 1/2007 | Gilmour | |
| 7,166,938 B2 | 1/2007 | Kang et al. | |
| 7,230,361 B2 | 6/2007 | Hirzel | |
| 7,305,752 B2 | 12/2007 | Graham | |
| 7,327,062 B2 | 2/2008 | Kaneko | |
| 7,328,500 B2 | 2/2008 | Kim et al. | |
| 7,342,475 B2 | 3/2008 | Weger | |
| 7,355,309 B2 | 4/2008 | Costin et al. | |
| 7,358,639 B2 | 4/2008 | Caamano | |
| 7,466,054 B2 | 12/2008 | Watson | |
| 7,466,058 B2 | 12/2008 | Dubois et al. | |
| 7,474,019 B2 | 1/2009 | Kang et al. | |
| 7,561,016 B2 | 7/2009 | Kubo | |
| 7,579,742 B1 | 8/2009 | Rittenhouse | |
| 7,605,515 B2 | 10/2009 | Koehler | |
| 7,608,968 B2 | 10/2009 | Toyoda et al. | |
| 7,626,308 B2 | 12/2009 | Kang et al. | |
| 7,626,309 B2 | 12/2009 | Watson | |
| 7,638,919 B2 | 12/2009 | Pulnikov et al. | |
| 7,669,311 B2 | 3/2010 | Iomel et al. | |
| 7,675,213 B2 | 3/2010 | Tenhunen | |
| 7,723,891 B2 | 5/2010 | Rittenhouse | |
| 7,755,244 B2 | 7/2010 | Ley et al. | |
| 7,772,741 B1 | 8/2010 | Rittenhouse | |
| 7,851,965 B2 | 12/2010 | Calley et al. | |
| 7,854,059 B2 | 12/2010 | Tapper | |
| 7,868,508 B2 | 1/2011 | Calley et al. | |
| 7,911,104 B2 | 3/2011 | Ifrim et al. | |
| 7,919,897 B2 | 4/2011 | Tajima et al. | |
| 7,923,886 B2 | 4/2011 | Calley et al. | |
| 7,952,252 B2 | 5/2011 | Kang et al. | |
| 7,969,048 B2 | 6/2011 | Ryan | |
| 7,973,446 B2 | 7/2011 | Calley et al. | |
| 7,994,678 B2 | 8/2011 | Calley et al. | |
| 8,008,821 B2 | 8/2011 | Calley et al. | |
| 8,030,814 B2 | 10/2011 | Sun et al. | |
| 8,030,819 B2 | 10/2011 | Calley et al. | |
| 8,033,007 B2 | 10/2011 | Jeung et al. | |
| 8,053,944 B2 | 11/2011 | Calley et al. | |
| 2004/0251759 A1 | 12/2004 | Hirzel | |
| 2006/0082237 A1 | 4/2006 | Kerlin | |
| 2006/0244324 A1 | 11/2006 | Graham et al. | |
| 2006/0255679 A1 | 11/2006 | Dine et al. | |
| 2008/0238232 A1 | 10/2008 | Bando et al. | |
| 2008/0246362 A1 | 10/2008 | Hirzel | |
| 2009/0007419 A1 | 1/2009 | Kubo | |
| 2009/0026866 A1 | 1/2009 | Groening et al. | |
| 2009/0108712 A1 | 4/2009 | Holtzapple et al. | |
| 2010/0013343 A1 | 1/2010 | Bi | |
| 2010/0038169 A1 | 2/2010 | Lee | |
| 2010/0163061 A1 | 7/2010 | Creighton | |
| 2010/0192357 A1 | 8/2010 | Mitsui et al. | |
| 2010/0253930 A1 | 10/2010 | Ito | |
| 2010/0307285 A1 | 12/2010 | Underwood | |
| 2010/0308679 A1 | 12/2010 | Yamashita et al. | |
| 2011/0050020 A1 | 3/2011 | Lazic et al. | |
| 2011/0074231 A1 | 3/2011 | Soderberg | |
| 2011/0084564 A1 | 4/2011 | Huang | |
| 2011/0148224 A1 | 6/2011 | Tokoi et al. | |
| 2011/0169357 A1 | 7/2011 | Gieras et al. | |
| 2011/0169366 A1 | 7/2011 | Calley et al. | |
| 2011/0248585 A1 | 10/2011 | Wang et al. | |
| 2011/0273035 A1 | 11/2011 | Calley et al. | |
| 2011/0278966 A1 | 11/2011 | Osborne et al. | |
| 2011/0278978 A1 | 11/2011 | Taniguchi et al. | |
| 2011/0298330 A1 | 12/2011 | Joeckel | |
| 2011/0304146 A1 | 12/2011 | Surodin | |
| 2012/0025637 A1 | 2/2012 | Calley et al. | |
| 2012/0030920 A1 * | 2/2012 | Lange | F03D 9/002 29/428 |
| 2012/0032537 A1 | 2/2012 | Okazawa | |
| 2012/0038169 A1 | 2/2012 | Azanza Ladron et al. | |
| 2012/0038236 A1 | 2/2012 | Tajima et al. | |
| 2012/0086302 A1 | 4/2012 | Hashimoto et al. | |
| 2012/0091832 A1 | 4/2012 | Soderberg | |

FOREIGN PATENT DOCUMENTS

| | | |
|---|---|---|
| JP | 55121622 | 9/1980 |
| JP | 55121623 | 9/1980 |
| JP | 57090924 | 6/1982 |
| JP | 4094515 | 3/1992 |
| JP | 4094516 | 3/1992 |
| JP | 5003127 | 1/1993 |
| JP | 5036546 | 2/1993 |
| WO | WO 88/06375 | 8/1988 |
| WO | WO 02/075895 | 9/2002 |
| WO | WO 2007/134566 | 11/2007 |
| WO | WO 2010/061200 | 6/2010 |
| WO | WO 2011/064550 | 6/2011 |
| WO | WO 2011/116776 | 9/2011 |
| WO | WO 2012/011191 | 1/2012 |

OTHER PUBLICATIONS

A New Concept for Weight Reduction of Large Direct Drive Machines; authors: G. Shresta, H. Plinder, D.J. Bang, J.A. Ferreira, A.S. McDonald ; Affiliation: Delf University of Technology (Netherlands) and WO (Great Britain) ; 2008.

Air-gap magnetic field design optimization for U-shaped ironless permanent magnet linear synchronous motors ; author: Peng Sun ; Affiliation: University of Beijing Huixing Zhou (People's Republic of China) ; Oct. 2008.

Design Considerations of Permanent Magnet Transverse Flux Machines; Authors: Kaiyuan Lu, Peter Omand Rasmussen, Ewen Ritchie ; Affiliation: Aalborg University (Denmark) ; Oct. 2011.

Soft Magnetic Composite with Lamellar Particles—Application to the Clawpole Transverse-Flux Machine with Hybrid Stator ; Authors: Patrick Lemieux, O. Jude Delma, Maxime R. Dubois, Roderick Guthrie ; Affiliation: McGill Metal Processing Center et Laboratoire d'Électronique, d'Électronique de Puissance et de Commande Industrielle (LEEPCI) (Canada) ; 2008.

Structural analysis and optimization of transverse flux permanent magnet machines for 5 and 10 MW direct drive wind turbines ; Authors: A. Zavvos, D. Bang, A.S. McDonald, H. Polinder, M. Mueller ; Affiliation: Delf University of Technology (Netherlands) and University of Edinburgh (Great Britain) ; Jan. 20, 2012.

Study of permanent magnet transverse flux motors with soft magnetic composite core ; Authors: Y.G. Guo and J.G. Zhu ; Affiliation: University of Technology, Sydney (Australia) ; Sep. 26/29, 2004.

The air gap and angle optimixation in the axial flux permanent Magnet motor ; Authors: C. Akuner and E. Huner.

* cited by examiner

METHOD OF MANUFACTURING A TRANSVERSE FLUX ELECTRICAL MACHINE ROTOR

CROSS-REFERENCES

The present invention relates to, claims priority from and is a non-provisional application of U.S. Provisional Patent Application No. 61/714,869, filed Oct. 17, 2012, entitled TRANSVERSE FLUX ELECTRICAL MACHINE ROTOR, which is incorporated herein by reference in its entirety.

BACKGROUND OF THE INVENTION

1. Field of the Invention

This invention relates generally to transverse flux electrical machines. The present invention more specifically relates to transverse flux alternators and motors assembly.

2. Description of the Related Art

Alternators and motors are used in a variety of machines and apparatuses to produce electricity from mechanical movements. They find applications for energy production and transportation, to name a few. Alternators and motors can use Transverse Flux Permanent Magnet (TFPM) technologies.

Transverse flux machines with permanent magnet excitation are known from the literature, such as the dissertation by Michael Bork, *Entwicklung and Optimierung einer fertigungsgerechten Transversalflußmaschine* [Developing and Optimizing a Transverse Flux Machine to Meet Production Requirements], Dissertation 82, RWTH Aachen, Shaker Verlag Aachen, Germany, 1997, pages 8 ff. The circularly wound stator winding is surrounded by U-shaped soft iron cores (yokes), which are disposed in the direction of rotation at the spacing of twice the pole pitch. The open ends of these U-shaped cores are aimed at an air gap between the stator and rotor and form the poles of the stator. Facing them, permanent magnets and concentrators are disposed in such a way that the magnets and concentrators that face the poles of a stator core have the opposite polarity. To short-circuit the permanent magnets, which in the rotor rotation are intermittently located between the poles of the stator and have no ferromagnetic short circuit, short-circuit elements are disposed in the stator.

Put otherwise, transverse flux electrical machines include a circular stator and a circular rotor, which are separated by an air space called air gap, that allows a free rotation of the rotor with respect to the stator, and wherein the stator comprises soft iron cores, that direct the magnetic flux in a direction that is mainly perpendicular to the direction of rotation of the rotor. The stator of transverse flux electrical machines also comprises electrical conductors, defining a toroid coil, which is coiled in a direction that is parallel to the direction of rotation of the machine. In this type of machine, the rotor comprises a plurality of identical permanent magnet parts, which are disposed so as to create an alternated magnetic flux in the direction of the air gap. This magnetic flux goes through the air gap with a radial orientation and penetrates the soft iron cores of the stator, which directs this magnetic flux around the electrical conductors.

In the transverse flux electrical machine of the type comprising a rotor, which is made of a plurality of identical permanent magnet parts, and of magnetic flux concentrators, the permanent magnets are oriented in such a manner that their magnetization direction is parallel to the direction of rotation of the rotor. Magnetic flux concentrators are inserted between the permanent magnets and redirect the magnetic flux produced by the permanent magnets, radially towards the air gap.

The transverse flux electrical machine includes a stator, which comprises horseshoe shaped soft iron cores, which are oriented in such a manner that the magnetic flux that circulates inside these cores, is directed in a direction that is mainly perpendicular to the axis of rotation of the rotor.

The perpendicular orientation of the magnetic flux in the cores of the stator, with respect to the rotation direction, gives to transverse flux electrical machines a high ratio of mechanical torque per weight unit of the electrical machine.

It is desirable that the magnets and the concentrators of the rotor of a transverse flux electrical machine be precisely mounted on the rotor to ensure a tight airgap with the stator portion when rotatably assembled with the stator portion.

It is also desirable that the rotor portion be rotatably mounted to an axial shaft with bearings and seals preventing any undesirable objects or dirt to get into the rotor portion.

One other desirable aspect consists in providing as strong and secure assembly of the concentrators and the magnets to the body of the rotor portion to prevent any undesirable removal of a concentrator and/or a magnet when the transverse flux electrical machine is in operation.

At least one aspect of the present invention provides an external rotor assembly adapted to rotate around the stator assembly to increase the effective airgap diameter while having a reduced overall stator and rotor assembly or, for example, to have a rotative external component.

It is therefore desirable to produce an electrical machine that is easy to assemble. It is also desirable to provide an electrical machine that is economical to produce. Other deficiencies will become apparent to one skilled in the art to which the invention pertains in view of the following summary and detailed description with its appended figures.

SUMMARY OF THE INVENTION

It is one aspect of the present invention to alleviate one or more of the shortcomings of background art by addressing one or more of the existing needs in the art.

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Generally, an object of the present invention provides a modular Transverse Flux Electrical Machine (TFEM), which can also be more specifically appreciated as Transverse Flux Permanent Magnet (TFPM), which includes phase modules thereof.

An object of the invention is generally described as a modular TFEM including a plurality of phase modules adapted to be axially assembled.

Generally, an object of the invention provides a TFEM including a rotor portion rotatably assembled to a stator module and including a plurality of phase modules axially assembled together with concentrators and magnets of the plurality of phases axially aligned.

One object of the invention provides a rotor portion adapted to be axially removed from its cooperating stator portion.

At least one object of the invention provides a rotor portion including two opposed axial rotor support members having different diameters which respectively and removably accommodate a bearing allowing rotation of the rotor portion in respect with the stator portion.

At lease one aspect of the invention provides a rotor portion including an alternate series of concentrators and magnets chemically secured to a rotatable non-magnetic frame and optionally further mechanically secured with belts thereon.

At least one aspect of the invention provides a rotor portion having insulated shaft and magnets and concentrators supporting structure to prevent Foucault current to damage the bearing supporting the shaft.

At least one object of the invention provides a rotor portion assembly including a magnets-and-concentrators supporting frame including a series of adjacent groves, or slots, adapted to radially and angularly locate the concentrators thereon.

At least one object of the invention provides a rotor portion assembly including a magnets-and-concentrators supporting frame made of non-magnetic material.

At least one aspect of the invention provides a rotor portion assembly including a rotatable supporting shaft shaped and designed to mechanically radially and axially locate a magnets-and-concentrators supporting frame thereon.

At least one aspect of the invention provides a rotor portion assembly including a magnets-and-concentrators supporting frame rotatably connected to a rotatable supporting shaft via at least one supporting plates including openings therein.

At least one aspect of the invention provides a method of assembling concentrators and magnets on a magnets-and-concentrators supporting frame including mechanically locating the concentrators on the magnets-and-concentrators supporting frame to bond the concentrators thereon and then machine the exterior diameter of the concentrators prior to assemble a magnet between two adjacent concentrators.

At least one object of the invention provides a tool adapted to locate and assemble at least one concentrator to a magnets-and-concentrators supporting frame, the tool being adapted to simultaneously secure a plurality of concentrators for a multiple phase rotor portion.

At least one object of the invention provides a tool adapted to locate and assemble at least one concentrator to a magnets-and-concentrators supporting frame, the tool being adapted to self locate with a concentrator-receiving slot in a magnets-and-concentrators supporting frame to properly axially and radially locate concentrators in the concentrator-receiving slot. A plurality of tool adapted to locate and assemble at least one concentrator to a magnets-and-concentrators supporting frame can be used simultaneously.

At least one aspect of the invention provides a tool adapted to locate and assemble at least one concentrator to a magnets-and-concentrators supporting frame, the tool being adapted to magnetically retain concentrators therein to self locate each concentrator in a concentrator-receiving space of the tool.

At least one other aspect of the present invention provides skewed magnets and concentrators in an external rotor assembly.

At least one aspect of the present invention provides keystone shaped magnets and concentrators.

At least one aspect of the present invention provides keystone shaped concentrators cooperating with magnets having straight/parallel walls and thus reduce the amount of magnet material.

At least one aspect of the present invention provides a method of assembling a rotor portion adapted to be used in a rotatable transverse flux electrical machine (TFEM), the method comprising assembling at least one concentrator to a concentrator-receiving jig; applying bonding material between the concentrator and a magnet-and-concentrator supporting frame; assembling the concentrator-receiving jig to the magnet-and-concentrator supporting frame wherein a radial reference portion of the concentrator-receiving jig is material to set a distance between the concentrator assembled to the concentrator-receiving jig and the magnet-and-concentrator supporting frame; repeating previous steps for all the concentrators to assemble to the magnet-and-concentrator supporting frame; curing the bonding material to secure the concentrators to the magnet-and-concentrator supporting frame; and removing the concentrator-receiving jig without the at least one concentrator that remains secured to the magnet-and-concentrator supporting frame.

At least one aspect of the present invention provides a method of assembling concentrators and magnets on a magnets-and-concentrators supporting member, the method comprising locating the concentrators on the magnets-and-concentrators supporting frame; and bonding the concentrators on the magnets-and-concentrators supporting frame.

At least one aspect of the present invention provides a tool adapted to locate and assemble at least one concentrator to a magnets-and-concentrators supporting frame, the tool being adapted to be located in respect with a corresponding concentrator-receiving element associated with the magnets-and-concentrators supporting frame to properly axially and angularly locate the at least one concentrator on the magnets-and-concentrators supporting frame.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

DESCRIPTION OF EMBODIMENT(S) OF THE INVENTION

Figure 1:
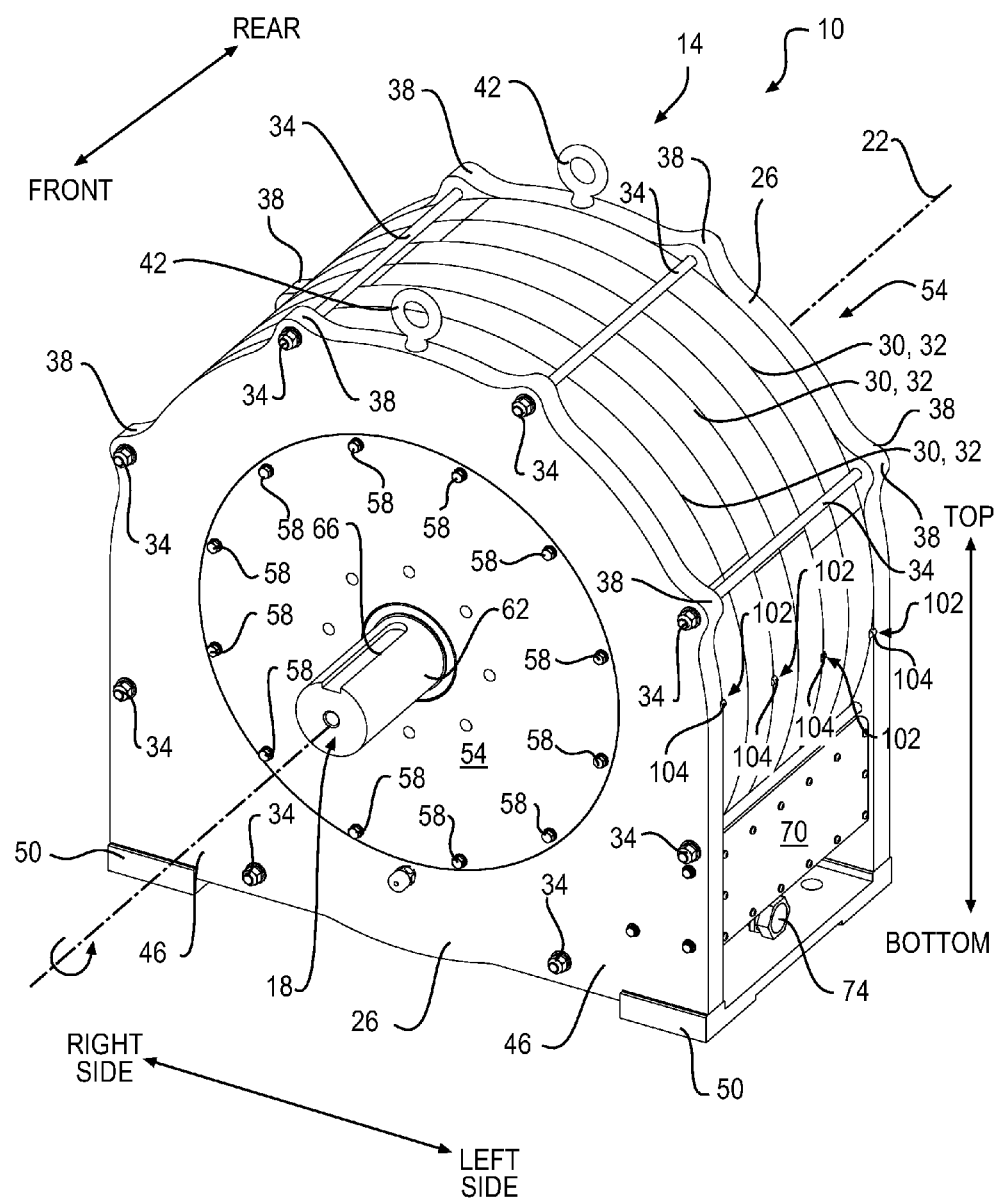
FIG. 1 is an isometric view of a TFEM in accordance with at least one embodiment of the invention.
Figure 2:
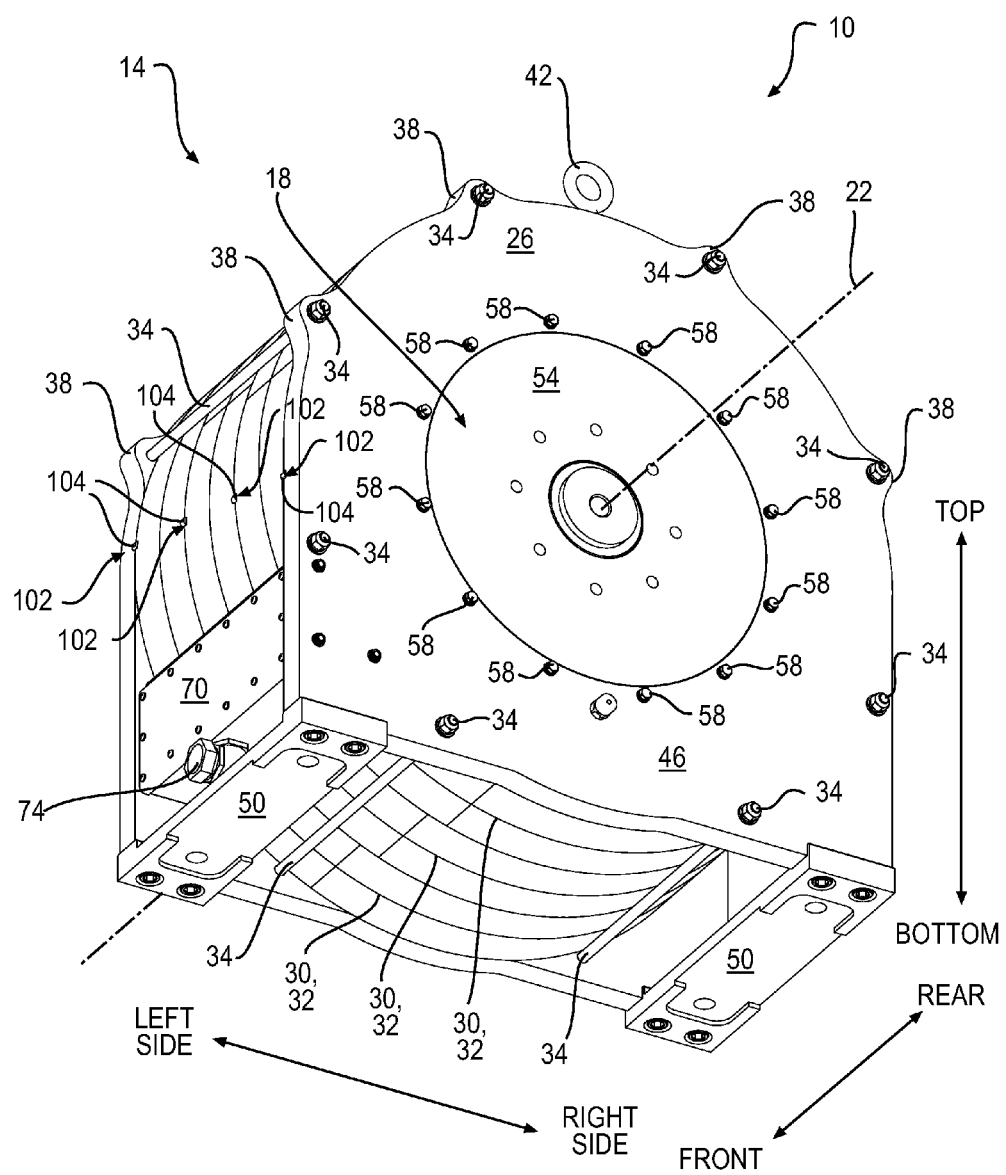
FIG. 2 is an isometric view of a TFEM in accordance with at least one embodiment of the invention.
Figure 3:
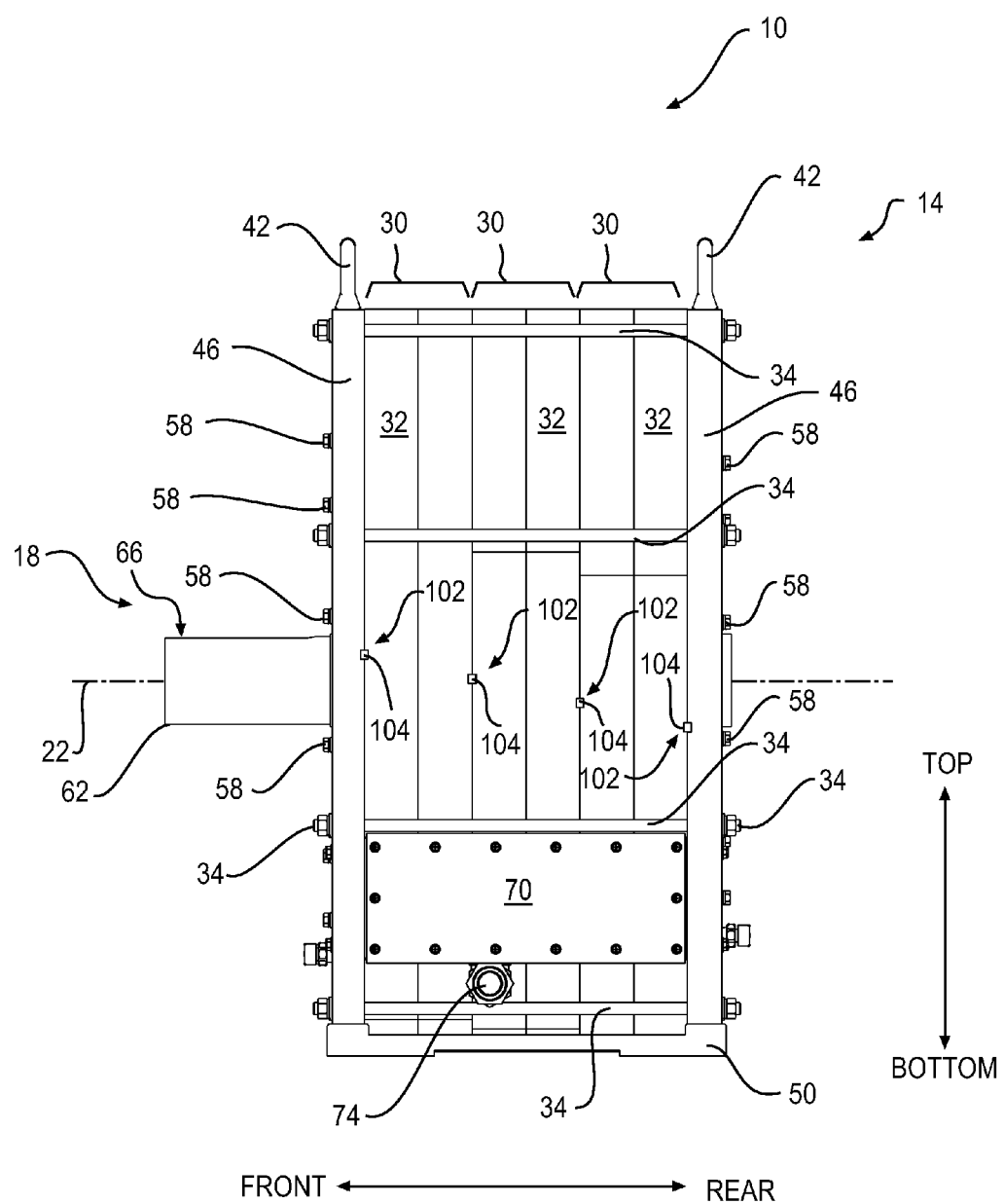
FIG. 3 is a left side elevational view of a TFEM in accordance with at least one embodiment of the invention.
Figure 4:
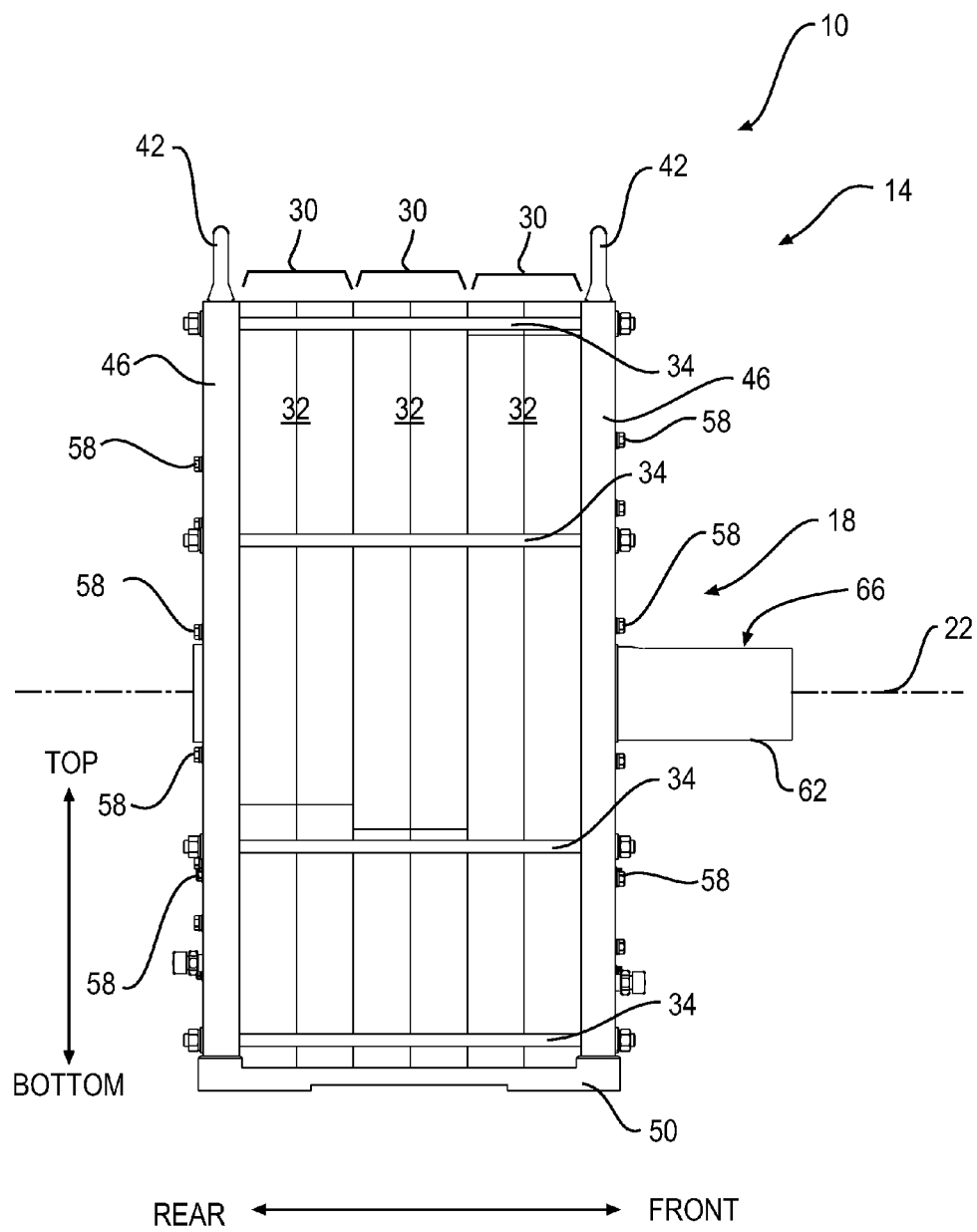
FIG. 4 is a right side elevational view of a TFEM in accordance with at least one embodiment of the invention.
Figure 5:
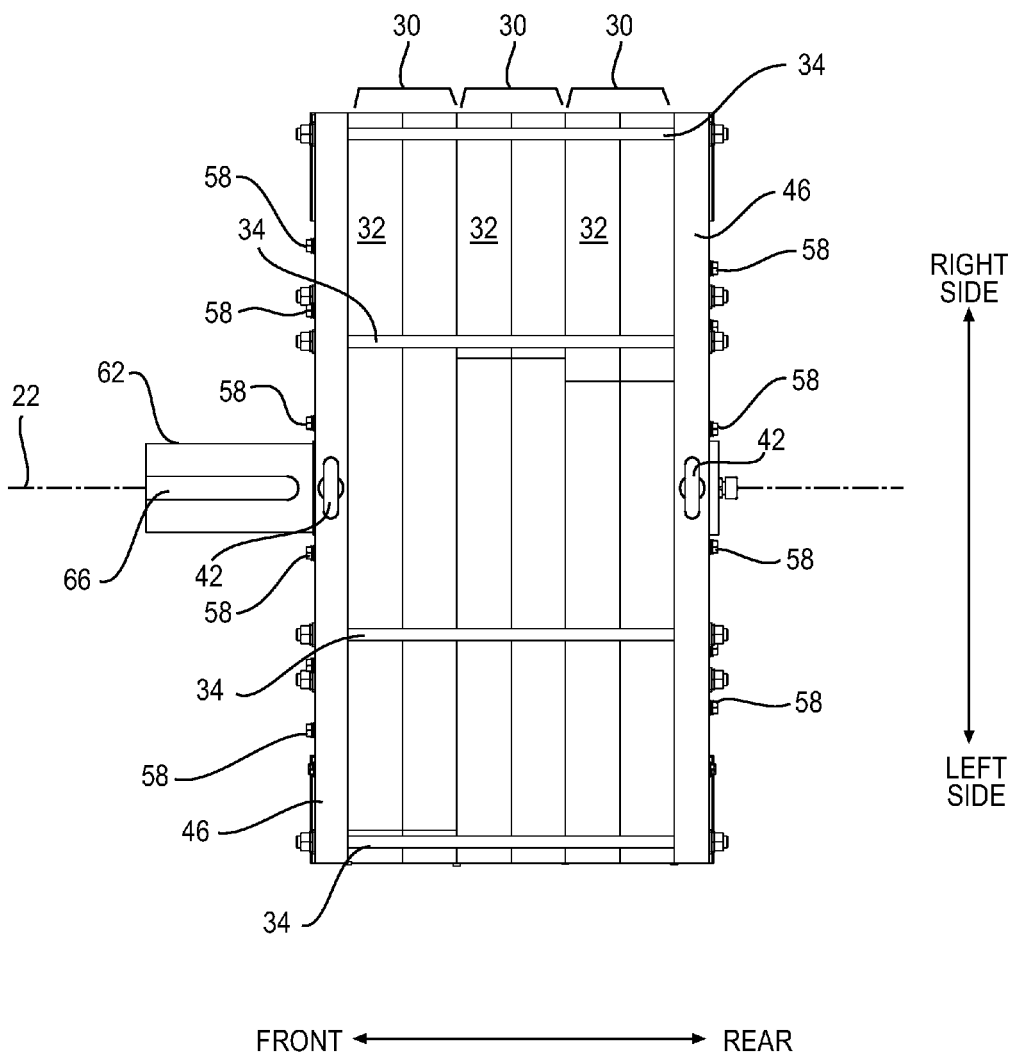
FIG. 5 is a top plan view of a TFEM in accordance with at least one embodiment of the invention.
Figure 6:
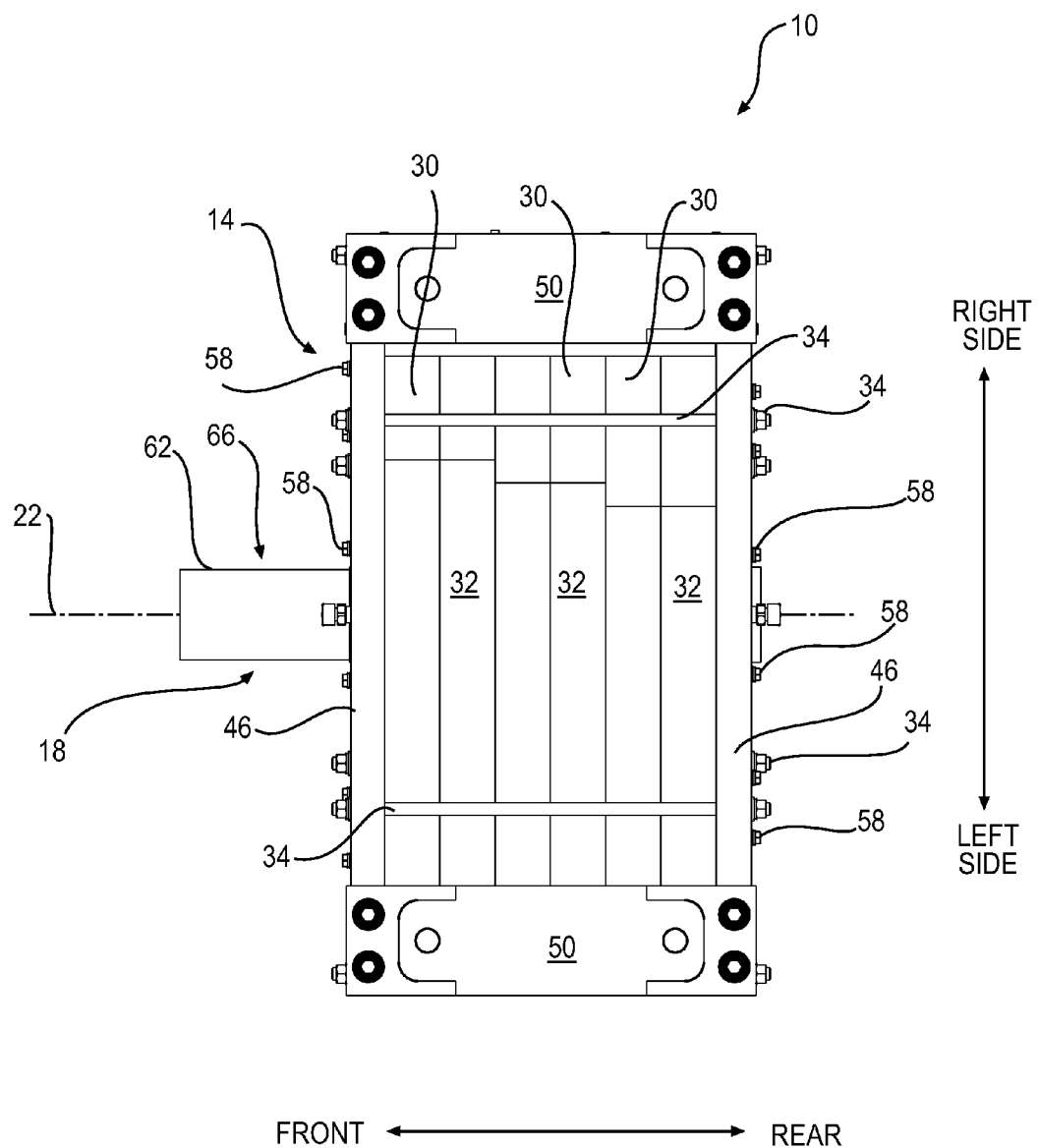
FIG. 6 is a bottom plan view of a TFEM in accordance with at least one embodiment of the invention.
Figure 7:
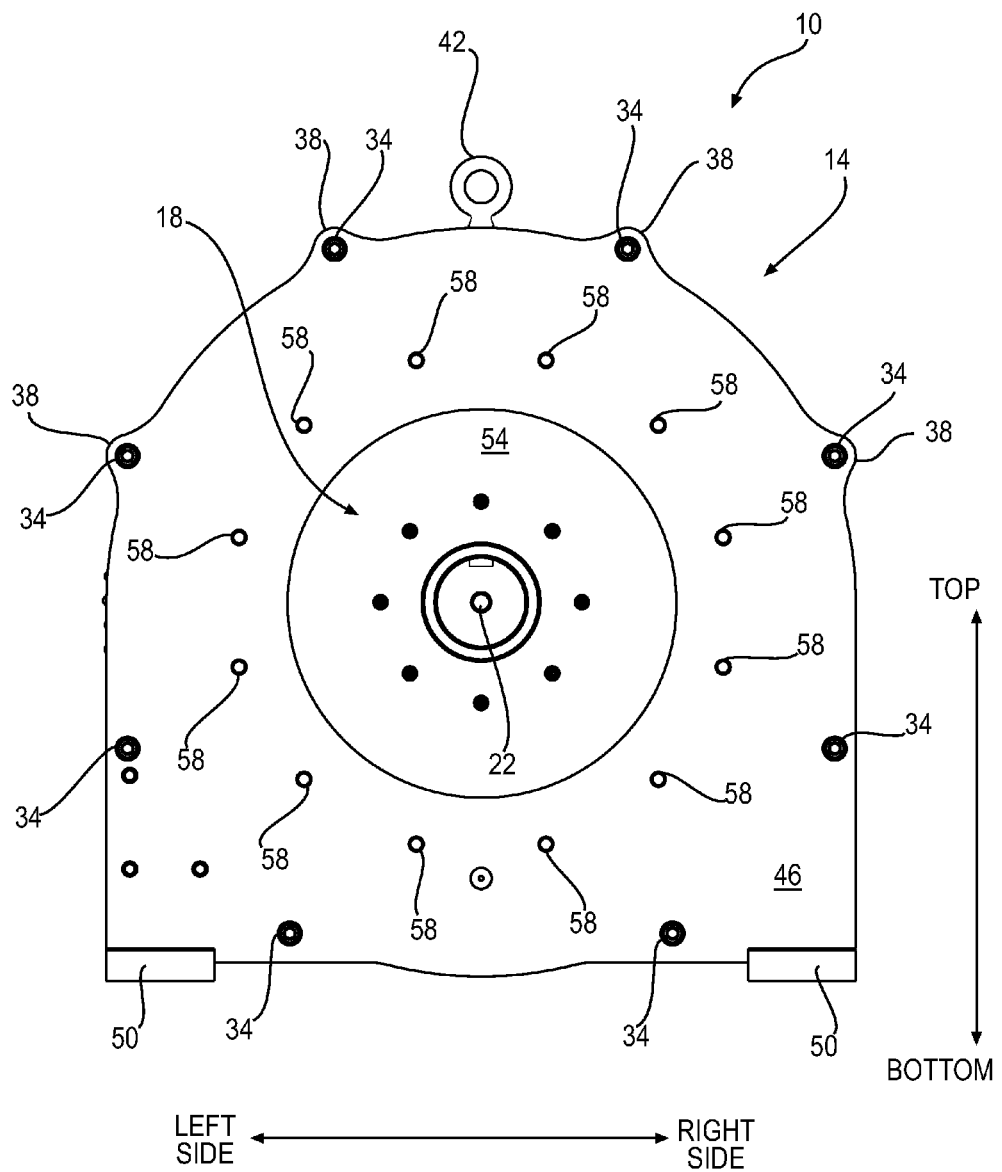
FIG. 7 is a rear elevational view of a TFEM in accordance with at least one embodiment of the invention.
Figure 8:
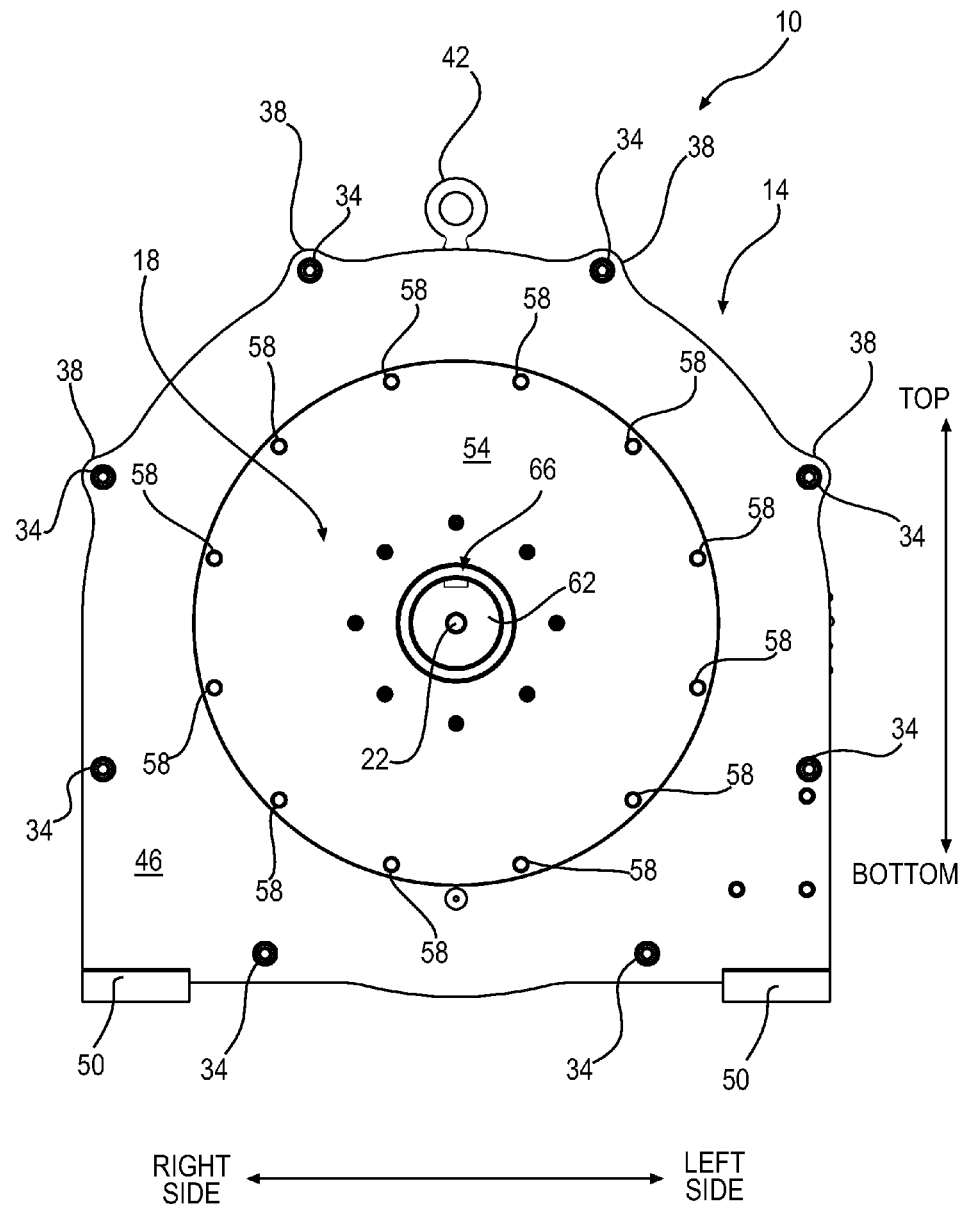
FIG. 8 is a front elevational view of a TFEM in accordance with at least one embodiment of the invention.

Our work is now described with reference to the Figures. In the following description, for purposes of explanation, numerous specific details are set forth in order to provide a thorough understanding of the present invention by way of embodiment(s). It may be evident, however, that the present invention may be practiced without these specific details. In other instances, when applicable, well-known structures and devices are shown in block diagram form in order to facilitate describing the present invention.

The embodiments illustrated below depict a TFEM 10 with thirty-two (32) poles and a 510 mm diameter at the air gap and a 100 mm length of the magnets. The configuration of the TFEM 10, an external rotor instead of an internal rotor, the number of phases can change in accordance with the desired power output, torque and rotational speed without departing from the scope of the present invention.

A TFEM 10 is illustrated in FIG. 1 through FIG. 8. The TFEM 10 includes a stator portion 14 and a rotor portion 18. The stator portion 14 is adapted to remain fixed while the rotor portion 18 is located within the stator portion 14 and is adapted to rotate in respect with the stator portion 14 about rotation axis 22. The TFEM of the illustrated embodiments has a modular construction. Two axial side members 26 are secured together to assemble three electrical phases 30 together, each being provided by a phase module 32. Each phase module 32 is adapted to individually provide an electrical phase 30 of alternating current. The present embodiment illustrates three phases 30 axially coupled together to provide tri-phased current when the TFEM 10 is rotatably actuated. The pair of axial side members 26 interconnects and axially secures together the three phases 30. Proper tension is applied to each of the plurality of axial securing members 34 to ensure the phase modules 32 remain fixedly secured together. In the present embodiment, each axial side member 26 is provided with a series of extending axial securing member receiving portions 38 adapted to receive the axial securing members 34 therein while the axial securing members 34 extends axially outside the phase modules 32. The axial securing members 34 could alternatively pass through the phase modules 32 in another unillustrated embodiment.

Still referring to FIG. 1 through FIG. 8, the axial side members 26 can be made of steel or other suitable material providing sufficient mechanical strength for the required purpose. Each axial side members 26 is optionally provided with a lifting link 42 sized and designed to receive therein, for example, a crane hook (not illustrated) to lift and move the TFEM 10. The axial side members 26 are further equipped with a support portion 46 adapted to secured thereto a pair of feet 50 configured to interconnect both axial side members 26 together and to further facilitate securing the TFEM 10 to a base chassis (not illustrated). For instance, the base chassis can be a nacelle when the TFEM 10 is installed in a windmill or alternatively any other chassis provided by the equipment the TFEM 10 is operatively connected to.

Each axial side member 26 is configured to receive and secure thereto an axial rotor support member 54. The axial rotor support member 54 is recessed in a circular cavity 56 (visible in FIG. 9) defined in its associated axial side member 26 to concentrically locate the rotor portion 18 in respect with the stator portion 14. The axial rotor support member 54 is further removably secured to its associated axial side member 26 with a plurality of fasteners 58. The actual configuration of the embodiment illustrated in FIG. 9 allows removal of the rotor portion 18 in one axial direction 60 when both axial rotor support members 54 are unsecured from their respective axial side member 26 because the circular cavities 56 are both located on the same side of their respective axial side member 26. This allows for easy maintenance of the TFEM 10 once installed in its operating configuration with its external mechanism.

As it is also possible to appreciate from the embodiment illustrated in FIGS. 1 through 8, the rotor portion 18 extends through the axial rotor support members 54 and rotatably engages both axial rotor support member 54. A solid rotor drive member 62 further extends from one axial rotor support members 54. The solid drive member 62 could alternatively be a hollowed drive member in another unillustrated embodiment. The drive member 62 is adapted to transmit rotatable motive power from an external mechanism (not illustrated) to the TFEM 10 and includes a drive securing mechanism 66 adapted to rotatably couple the drive member 62 of the TFEM 10 to a corresponding rotatable drive element from the external mechanism (not illustrated). The external mechanism (not illustrated) could, for example, be a windmill rotatable hub (not illustrated) to which the rotor blades (not illustrated) are secured to transmit rotational motive power to the TFEM 10. The external mechanism expressed above is a non-limitative example and other external mechanisms adapted to transmit rotational motive power to the TFEM 10 are considered to remain within the scope of the present application.

The TFEM 10 is further equipped with a protective plate 70 adapted to store and protect electrical connectors and electrical wires that extends from the TFEM 10 through an electrical outlet 74.

Figure 9:
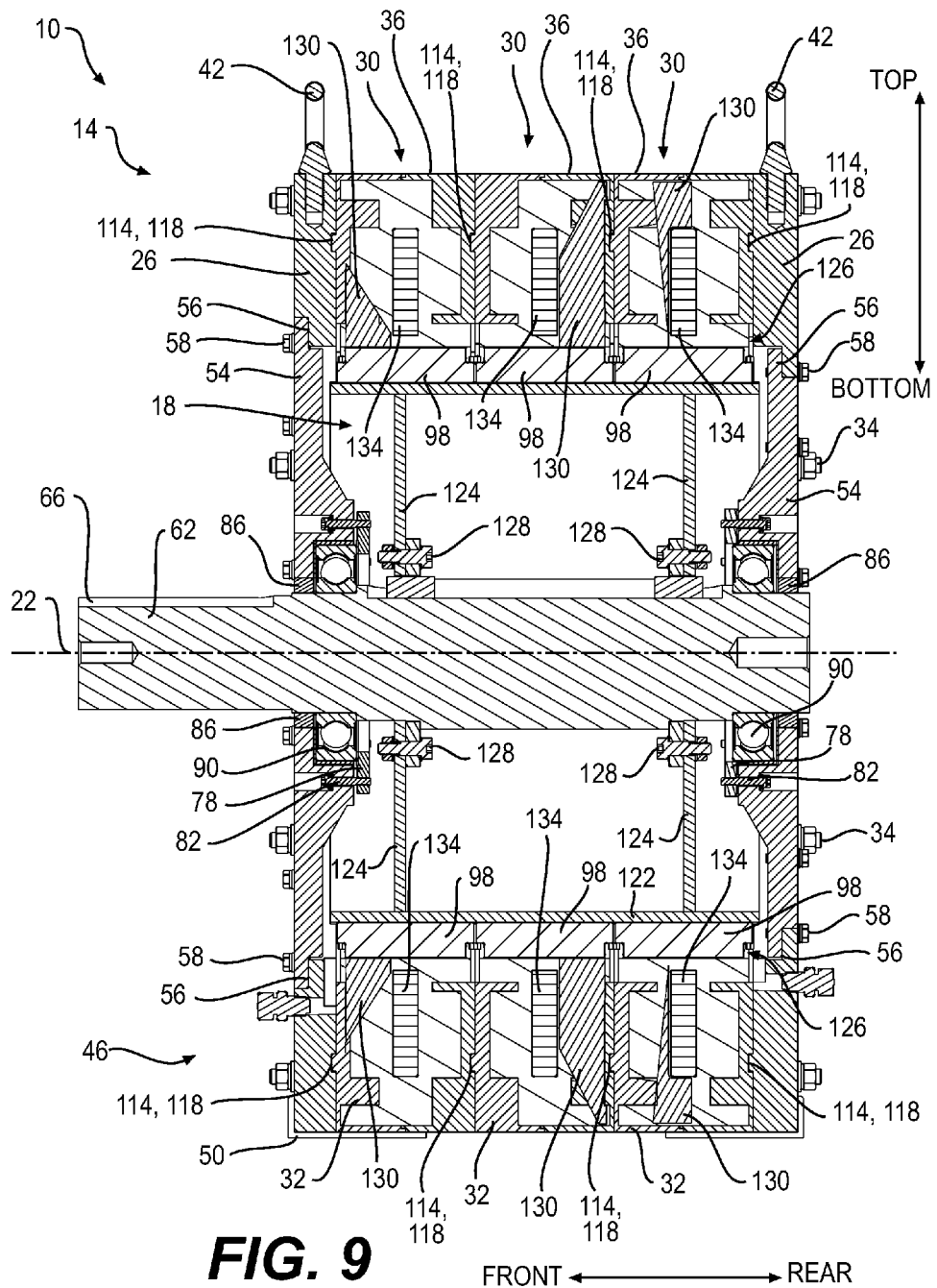
FIG. 9 is a section view of a TFEM illustrating multiple phase modules in accordance with at least one embodiment of the invention.

A section view of the TFEM 10 is illustrated in FIG. 9. The rotor portion 18 includes a magnet-and-concentrator supporting frame, hereinbelow referred to as a cylindrical frame 122, preferably removably secured to the rotatable drive member 62 with a series of fasteners 128, and associated nuts 132, via two plates 124 radially extending from the drive member 62. As explained above, the cylindrical frame 122 is sized and designed to accommodate three electrical phases 30, each provided by a phase module 36 including its alternate series of magnets 94 and concentrators 98 secured thereon. The circular stator portion 14 and the circular rotor portion 18 are separated by an air space called "air gap" 126 that allows an interference-free rotation of the rotor portion 18 with respect to the stator portion 14. Generally, the smaller is the air gap 126 the more performance the TFEM is going to provide. The air gap 126 is however limited to avoid any mechanical interference between the stator portion 14 and the rotor portion 18 and is also going to be influenced by manufacturing and assembly tolerances in addition to thermic expansion of the parts when the TFEM 10 is actuated. The stator portion 14 comprises soft iron cores (cores) 130 that direct the magnetic flux in a direction that is mainly perpendicular to the direction of rotation of the rotor portion 18. The stator portion 14 of TFEM 10 also comprises in each phase module 32 electrical conductors defining a toroid coil 134 that is coiled in a direction that is parallel to the direction of rotation of the TFEM 10. In this embodiment, the rotor portion 18 comprises a plurality of identical permanent magnets 94, which are disposed so as to create an alternated magnetic flux in the direction of the air gap 126. This magnetic flux goes through the air gap 126 with a radial orientation and penetrates the soft iron cores 130 of the stator portion 14, which directs this magnetic flux around the toroid coil 134.

In the TFEM 10 of the type comprising a rotor portion 18 including a plurality of identical permanent magnets 94 and of magnetic flux concentrators 98, the permanent magnets 94 are oriented in such a manner that their magnetization direction is parallel to the direction of rotation of the rotor portion 18, along rotation axis 22. Magnetic flux concentrators 98 are disposed between the permanent magnets 94 and redirect the magnetic flux produced by the permanent magnets 94 radially towards the air gap 126. In contrast, the stator portion 14 comprises "horseshoe-shaped" soft iron cores 130, which are oriented in such a manner that the magnetic flux that circulates inside these cores 130 is directed in a direction that is mainly perpendicular to the direction of rotation of the rotor portion 18. The perpendicular orientation of the magnetic flux in the cores 130 of the stator portion 14, with respect to the rotation direction, gives to TFEM a high ratio of mechanical torque per weight unit of the electrical machine.

Figure 10:
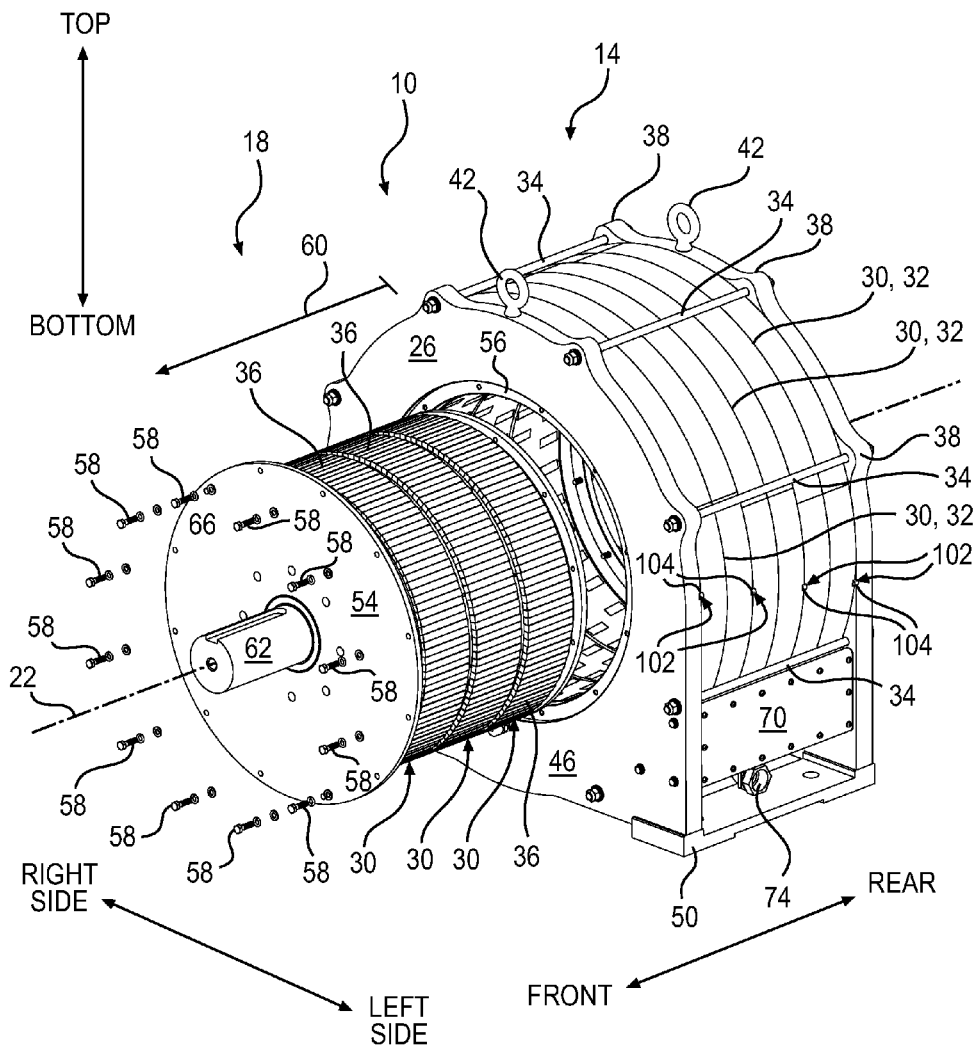
FIG. 10 is an isometric semi-exploded view of a TFEM illustrating a stator portion and a rotor portion in accordance with at least one embodiment of the invention.

Turning now to FIG. 10 illustrating a semi-exploded TFEM 10 where a skilled reader can appreciate the depicted rotor portion 18 is axially extracted 60 from the stator portion 14. The rotor portion 18 is axially extracted 60 from the stator portion 14 by removing the plurality of fasteners 58 and unsecuring the axial rotor support members 54 from their respective associated axial side member 26. It can be appreciated that the rotor portion 18 of the exemplary embodiment has three distinct modular phases 36, each providing an electrical phase 30, adapted to axially align and operatively cooperate with the three phase modules 32 of the exemplified stator portion 14.

Figure 11:
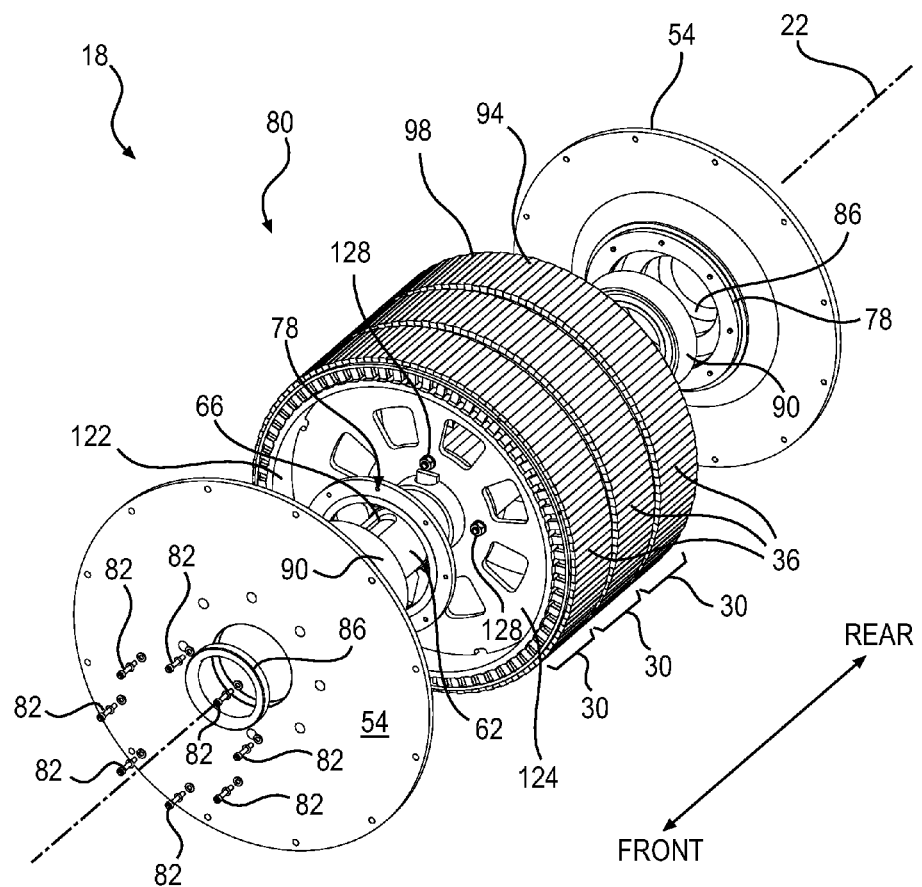
FIG. 11 is an isometric semi-exploded view of a portion of a TFEM illustrating a rotor portion in accordance with at least one embodiment of the invention.

FIG. 11 illustrates a further exploded view of the rotor portion 18. As indicated above, the rotor portion 18 is adapted to rotate in respect with the stator portion 14. The speed of rotation can differ depending of the intended purpose. Power remains function of the torque and the rotation speed of the rotor portion 18 therefore the TFEM is going to produce more power if the TFEM rotates rapidly as long as its operating temperature remains in the operating range of its different parts to prevent any deterioration (e.g. magnet demagnetization or insulating varnish deterioration, to name a few. The axial rotor support members 54 are adapted to be unsecured from the bearing holder 78 by removing the plurality of fasteners 82. A sequence of assembled seal 86, bearing 90 and bearing holder 78 is used on the front side of the rotor portion 18 while the same type of assembly is used on the opposite axial side of the rotor portion 18 to rotatably secure the rotor 80 to the axial rotor support members 54. FIG. 11 also illustrates that each phase module 36 of the rotor 80 uses a sequence of alternating permanent magnets 94 and concentrators 98. Strong permanent magnets 94 can be made of Nb—Fe—B as offered by Hitachi Metals Ltd and NEOMAX Co. Ltd. Alternatively, suitable magnets can be obtained by Magnequench Inc. and part of this technology can be appreciated in patents U.S. Pat. Nos. 5,411,608, 5,645,651, 6,183,572, 6,478,890, 6,979,409 and 7,144,463.

The axial rotor support members 54 are disassembled from the rotor portion 18 in the semi-exploded view of the rotor portion 18 in FIG. 11. The axial rotor support members 54 are preferably made of a material that is mechanically strong enough to sustain the mechanical loads applied thereon when the TFEM 10 is assembled and in operation. The axial rotor support members 54 illustrated in the embodiments of FIG. 11 are round to facilitate the axial alignment of the rotor portion 18 with the stator portion 14 when the axial rotor support members 54 are secured to the axial side members 26. Each axial rotor support members 54 accommodates a bearing assembly including a seal 86 preventing foreign material to enter the TFEM 10 assembly. The seal 86 is pressed fitted into an opening sized and designed accordingly in the axial rotor support members 54. A series of fasteners 82 are disposed in a bolt circle on the axial rotor support members 54 to secure on the interior side of the axial rotor support members 54 a bearing holder 78 adapted to receive therein a bearing 90. The bearing 90 supports the drive member 62 in a rotatable fashion to allow rotation of the rotatable elements of the rotor portion 18 in respect with the stator portion 14.

Figure 12:
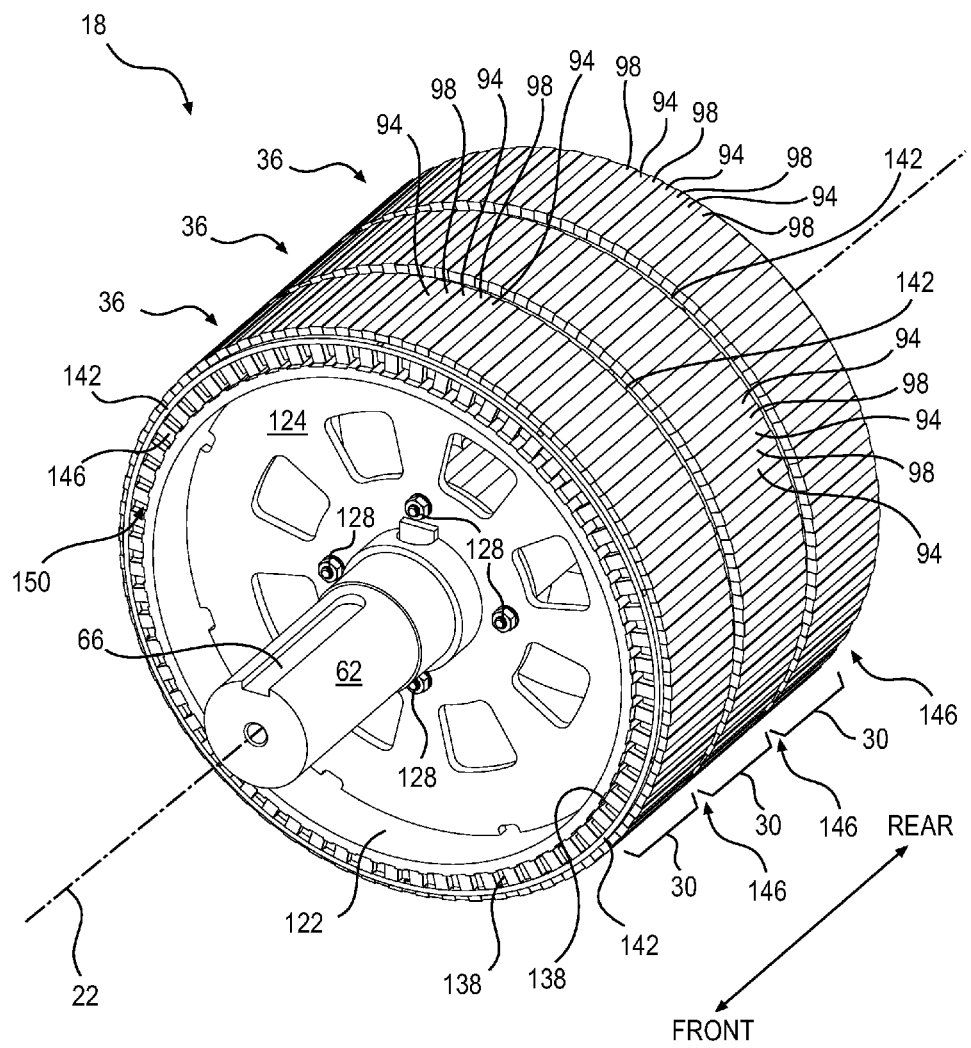
FIG. 12 is an isometric semi-exploded view of a TFEM illustrating a rotor portion in accordance with at least one embodiment of the invention.
Figure 13:
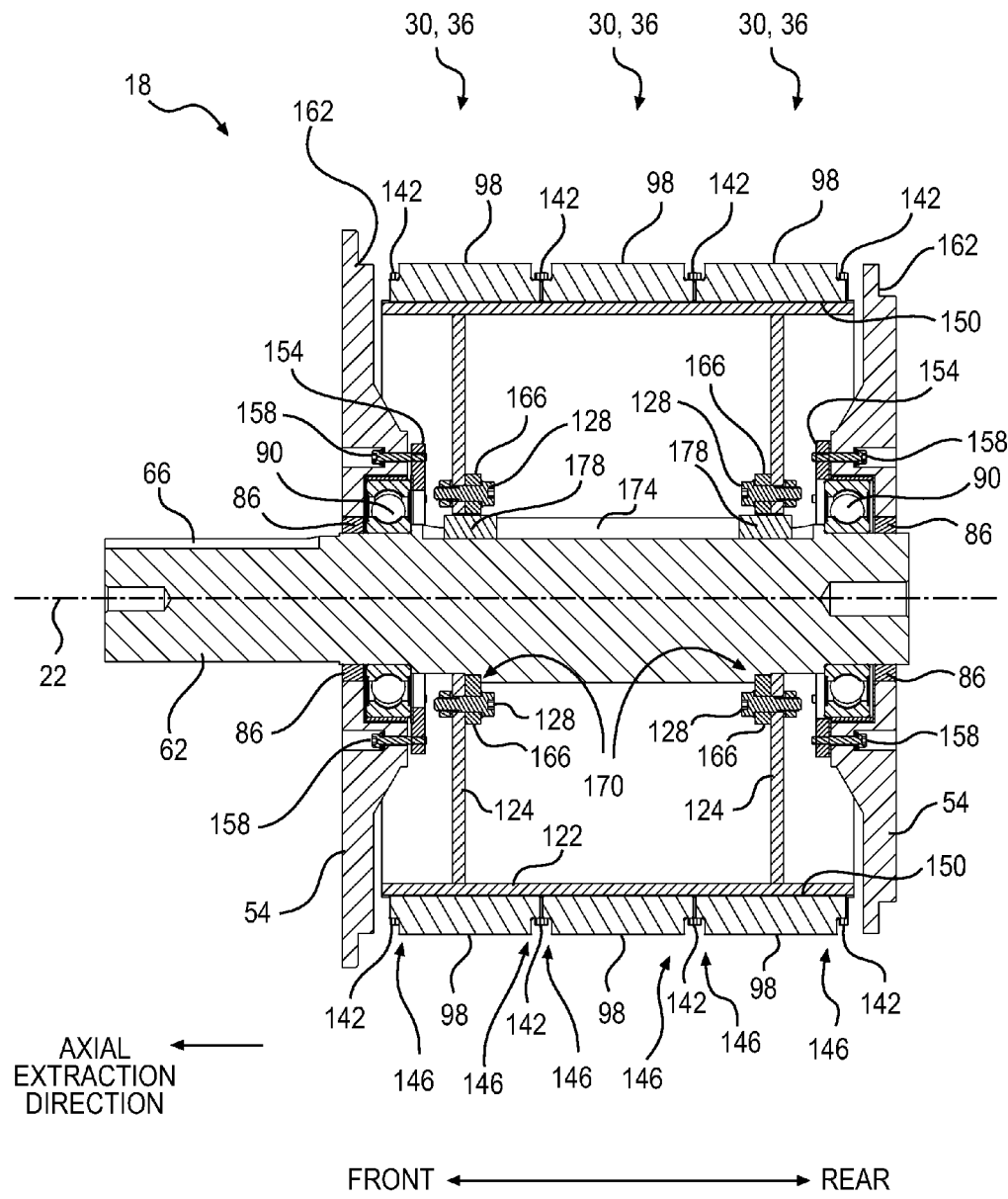
FIG. 13 is a section view of the rotor portion of a TFEM in accordance with at least one embodiment of the invention.

FIG. 12 and FIG. 13 illustrate in greater details rotatable elements of the embodied rotor portion 18. A skilled reader will notice that each phase 30 of the three illustrated phases 36 of the rotor portion 18 include a respective series of radially alternated magnets 94 and concentrators 98. The series of magnets 94 and concentrators 98 are evenly distributed in a cylindrical shape about and at substantially the same radial distance from the rotation axis 22. The series of magnets 94 and concentrators 98 are supported by a cylindrical frame 122 including a series of sixty four (64) parallel grooves 138 therein to locate the magnets 94 and concentrators 98 at their desired positions. Different configurations of TFEM 10 are possible and the number of grooves 138 can be adjusted accordingly. The cylindrical frame 122 is made of a non-magnetic material to prevent any undesirable magnetic interference between the magnets 94 and the concentrators 98. For instance, the cylindrical frame 122 of the present embodiment is made of aluminum for the reason expressed above, for its light weight and also because aluminum is a good conductor to carry heat. The cylindrical frame 122 is connected to the drive member 62 with a pair of plates 124 also made of non-magnetic material. The plates 124 are preferably removably secured to the drive 62 via a circular flange 166. The circular flange is abutted on a shoulder portion 170 provided on the drive 62 to prevent the flanges 166 to axially move in respect to one another. An axial groove 174 is performed in the drive 62 to receive therein a key member 178 adapted to lock relative rotational movements of the plates 124 and the cylindrical frame 122 about the drive 62. In so doing, rotational and longitudinal movements can be temporarily secured prior welding the circular flange 166 and the key member 178 to the drive 62. The plates 124 and the cylindrical frame 122 are then permanently positioned and secured about the drive 62. I can become apparent to a skilled reader that other ways of securing the cylindrical frame 122 to the drive member 62 are possible and remain within the scope of the present invention.

The concentrators 98 are first secured to the cylindrical frame 122 with a bonding material 150. Strong industrial adhesive 150, such as Loctite 9432 NA, applied and cured properly, is recommended although other securing means can be used without departing from the present invention. More details regarding the method for installing the magnets 94 and the concentrators 98 are going to be provided later. The cylindrical frame 122 and the concentrators 98, once the adhesive 150 has cured and the concentrators 98 are firmly secured to the cylindrical frame 122, are turned on a lathe to bring the diameter of the overall assembly to a desired dimension for ensuring a tight airgap 126 when assembled to the cooperating stator portion 14. The correction of the overall diameter is made prior to installing the magnets 94 between the concentrators 98 to prevent magnetically collecting the metallic residues created in the process of turning the cylindrical frame 122 and the concentrators 98 assembly. The magnets 94 are then simply inserted between their respective adjacent concentrators 98 in a first embodiment and only are maintained in place by the magnetic attraction to the concentrators 98. Industrial adhesive 150 can be used to further secure the magnets 94 in a similar fashion between the concentrators 98. The height of the magnets 94 is generally smaller than the height of the concentrators 98 and do not exceed the height of the latter thus do not need to be machined on a lathe. This also saves valuable ferromagnetic material.

Non-magnetic belts 142 are further mechanically securing the concentrators 98 to ensure they remain in place on the cylindrical frame 122. The belts 142 can be made of a stainless steel coil winded over the lateral shoulder extremities of the concentrators 98. The belts 142 are preferably not contacting the magnets 94 to limit the amount of magnet material, that is expensive, and because the magnet material is generally mechanically weak and would risk breaking under the force applied by the belts 142.

Still referring to FIG. 12 and FIG. 13, one can appreciate that the bearings 90 are respectively secured by a bearing holder 154 tighten and secured by an array of fasteners 158. It is clearly visible from FIG. 13 that the axial rotor support members 54 are not of similar diameters. The axial rotor support member 54 on the front of the rotor portion 18 has a larger diameter than the axial rotor support member 54 on the rear side of the rotor portion 18 to allow axial extraction of the rotor portion 18 from the stator portion 14. Extraction would be impossible without removing the rear axial rotor support member 54 from the drive member 62 should both axial rotor support members 54 be the same diameter. One can also appreciate the indentations 162 used to axially localize the rotor portion 18 in respect with the stator portion 14 are disposed on the same side of their respective axial rotor support member 54.

Figure 14:
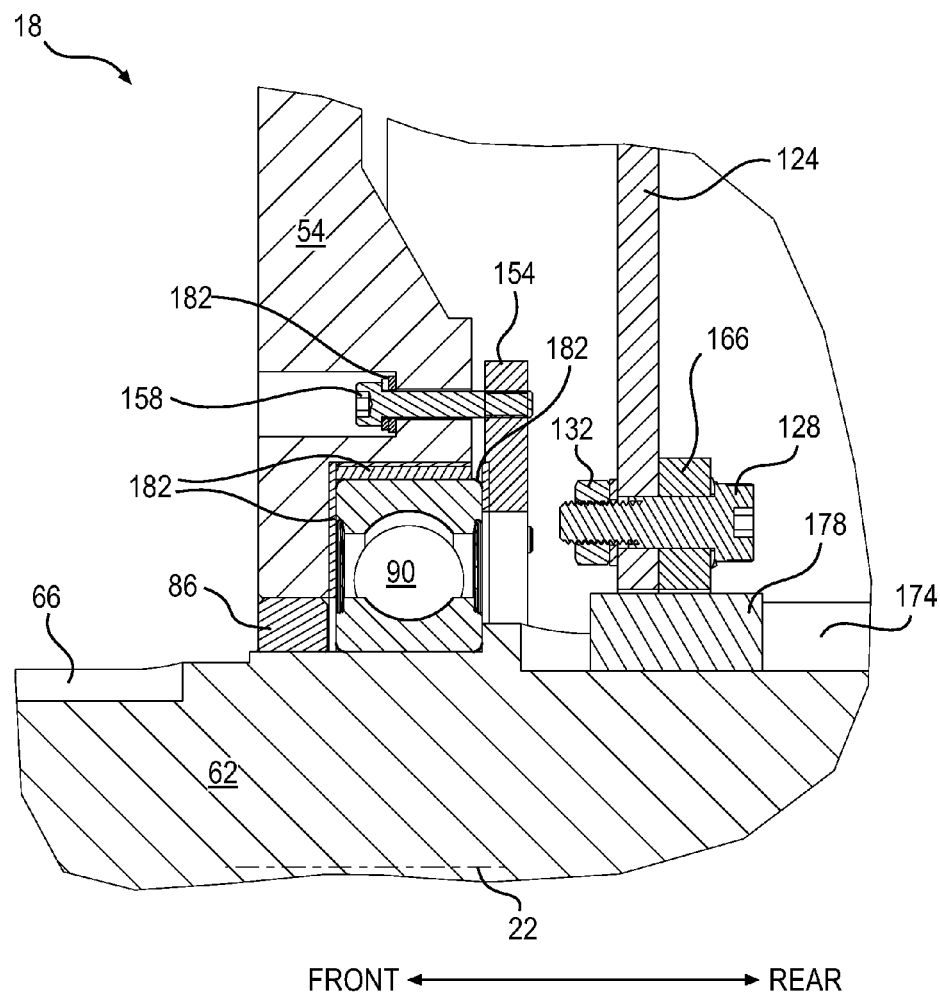
FIG. 14 is a magnified section view of the stator portion of the TFEM in accordance with at least one embodiment of the invention.
Figure 15:
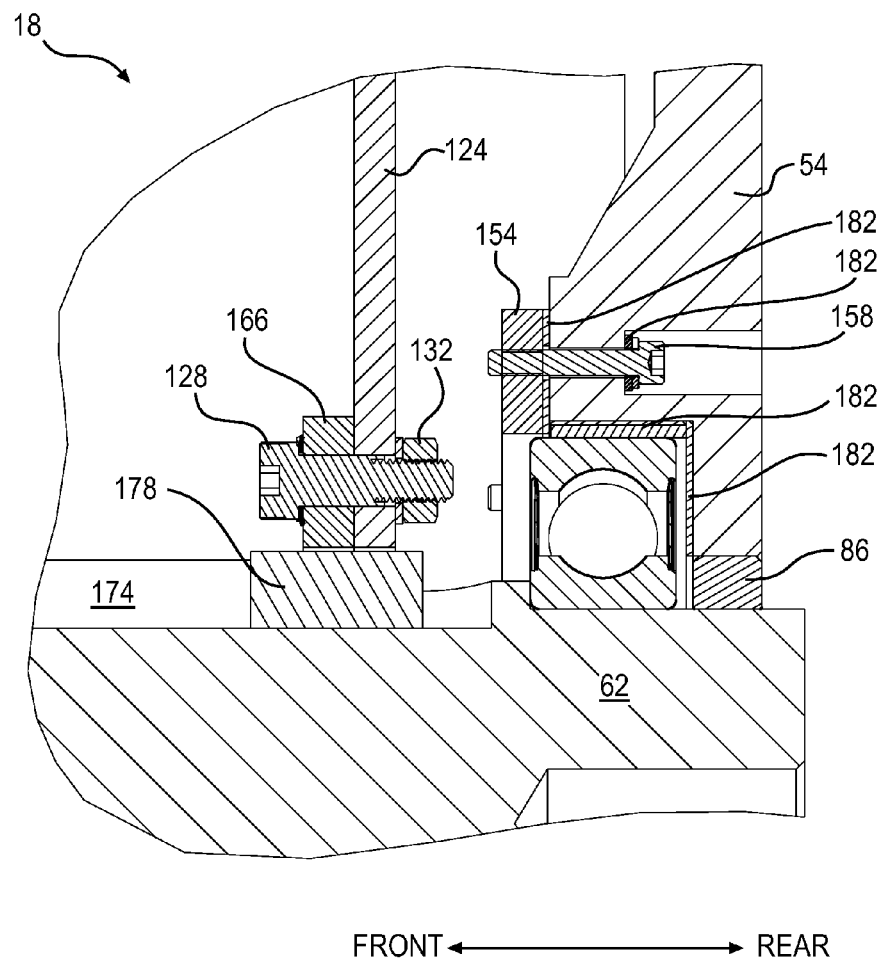
FIG. 15 is a magnified section view of the stator portion of the TFEM in accordance with at least one embodiment of the invention.

FIG. 14 illustrates in greater details the bearing assembly of the rotor portion 18 located on the front side of the TFEM 10. One can appreciate that the bearing 90 is electrically insulated, with an insulating member 182, from the other parts to prevent any electrical current transfer between the drive 62, and its associated rotating parts, and the axial rotor support member 54, and its associated fixed parts. Foucault currents and currents created by high transient voltage are thus insulated hence preventing the bearings 90 to be a means to transfer current and possibly be sparked thus likely reducing their useful life expectancy. The insulating material used in the illustrated embodiment is a sheet material sold by Protectolite Inc. under the code GPO-3. Petrolite GPO-3 is an electrical grade sheet manufactured under high heat and pressure in matched metal moulds and are excellent fire and track resistant, and meets NEMA Standards. Other suitable mechanically strong and insulating materials could be used without departing from the scope of the present invention. One can appreciate from FIG. 15 that a similar assembly secures the bearing assembly of the rotor portion 18 located on the rear side of the TFEM 10.

Figure 16:
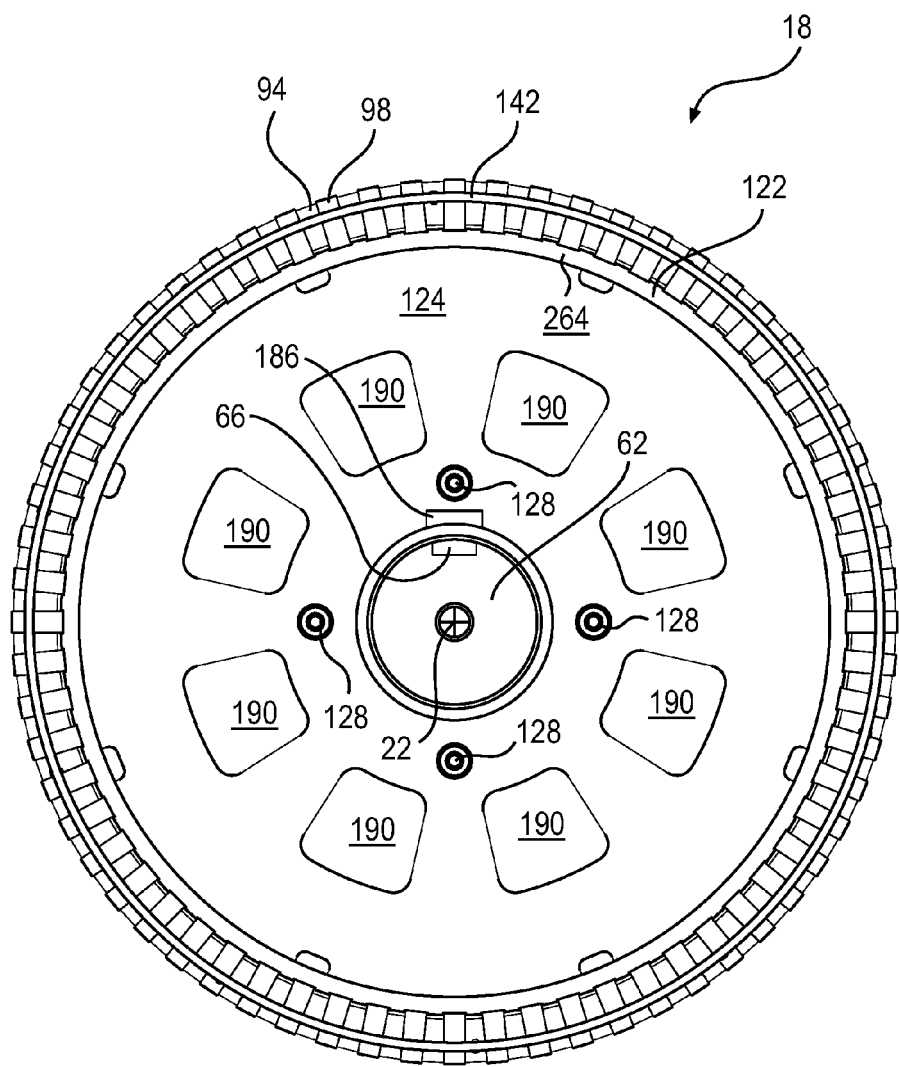
FIG. 16 is a front elevation view of the rotor in accordance with at least one embodiment of the invention.
Figure 17:
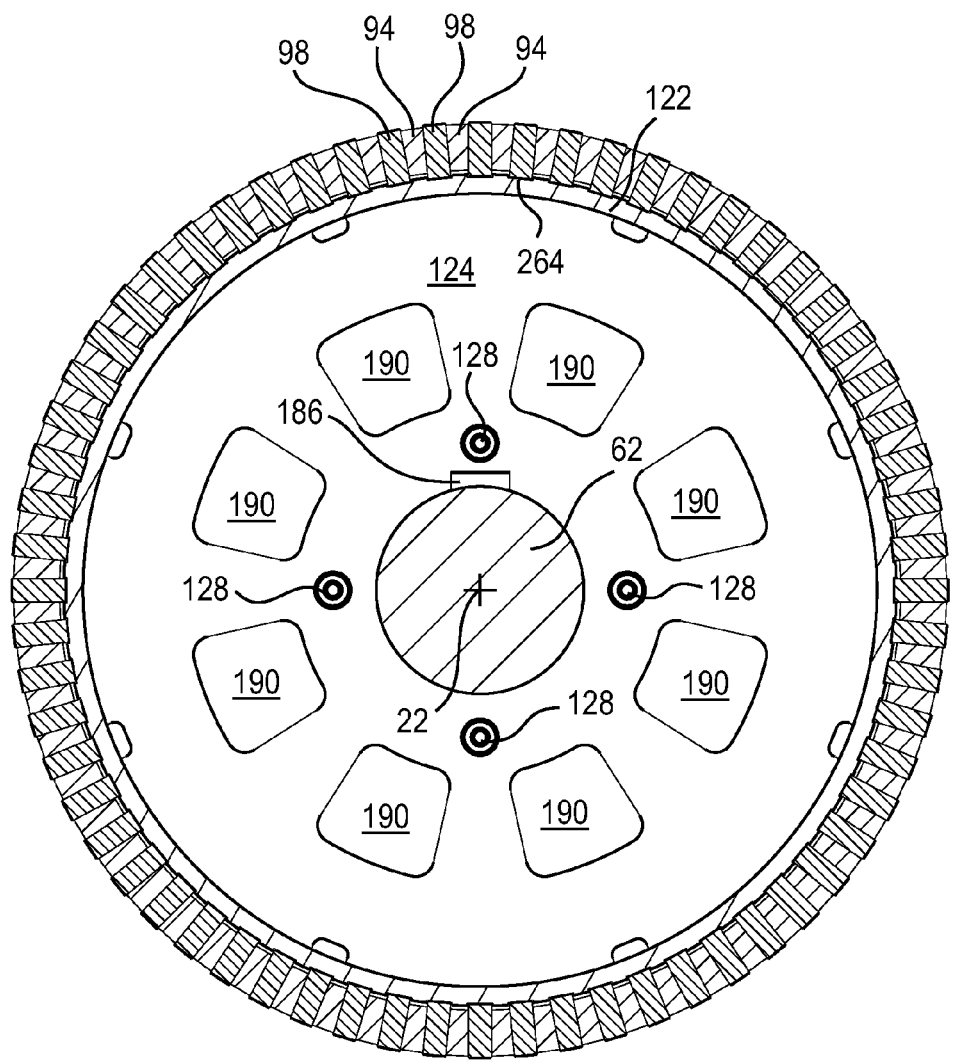
FIG. 17 is a sectional front elevation view of the rotor in accordance with at least one embodiment of the invention.
Figure 18:
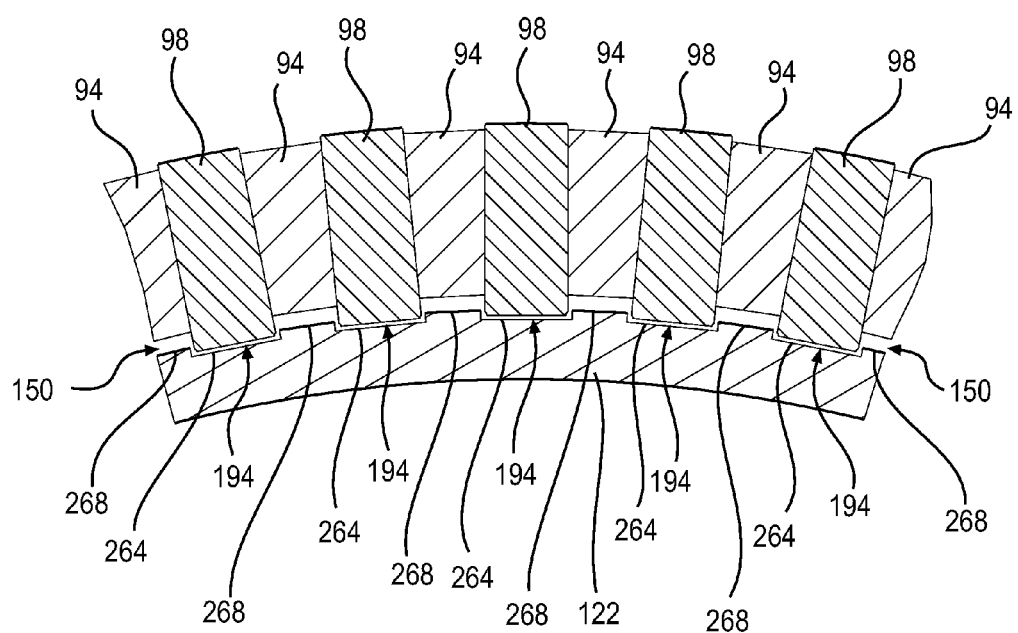
FIG. 18 is a sectional view of a portion of the magnets and concentrators assembly in accordance with at least one embodiment of the invention.

Moving now to FIG. 16 illustrating a front elevation view of the rotatable parts of the rotor portion 18. One can appreciate the plate 124 includes a cut portion 186 adapted to allow the passage therethrough of the key member 178, once the key member 178 is permanently assembled to the drive 62, to be able to disassemble the drive 124 from the pair of plates 124. An array of openings 190 are present in the plates 124 for lighten the rotatable parts and to allow air exchange between the different parts of the assembly. FIG. 17 is a section view of the rotatable parts illustrated in FIG. 17. One skilled in the art can appreciate the array of magnets 94 and concentrators 98 disposed about the rotation axis 22. Further magnified, a portion of the magnets 94 and concentrators 98 layout is shown in FIG. 18 where a space 194 filled with adhesive 150. FIG. 18 is illustrates a magnified portion of the assembly in FIG. 17.

Figure 19:
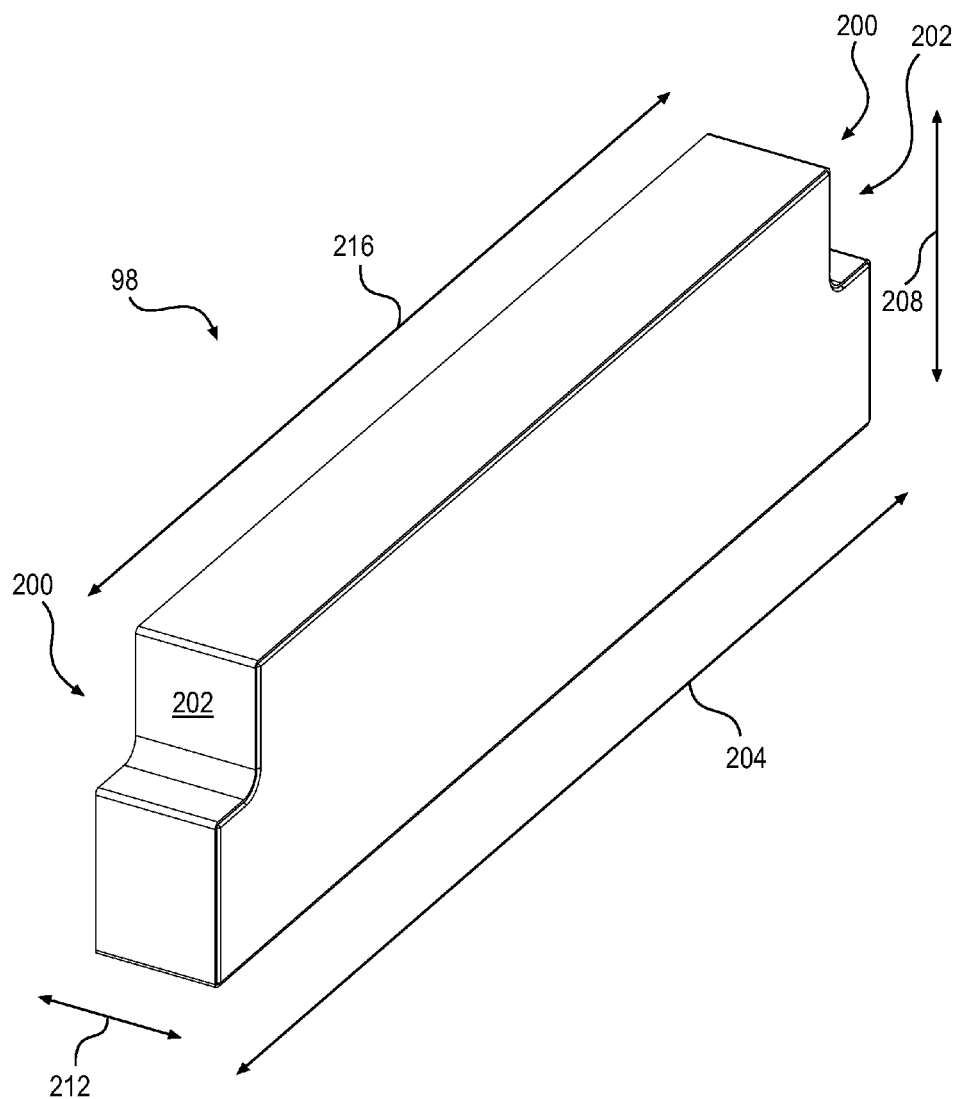
FIG. 19 is an isometric view of a concentrator in accordance with at least one embodiment of the invention.
Figure 20:
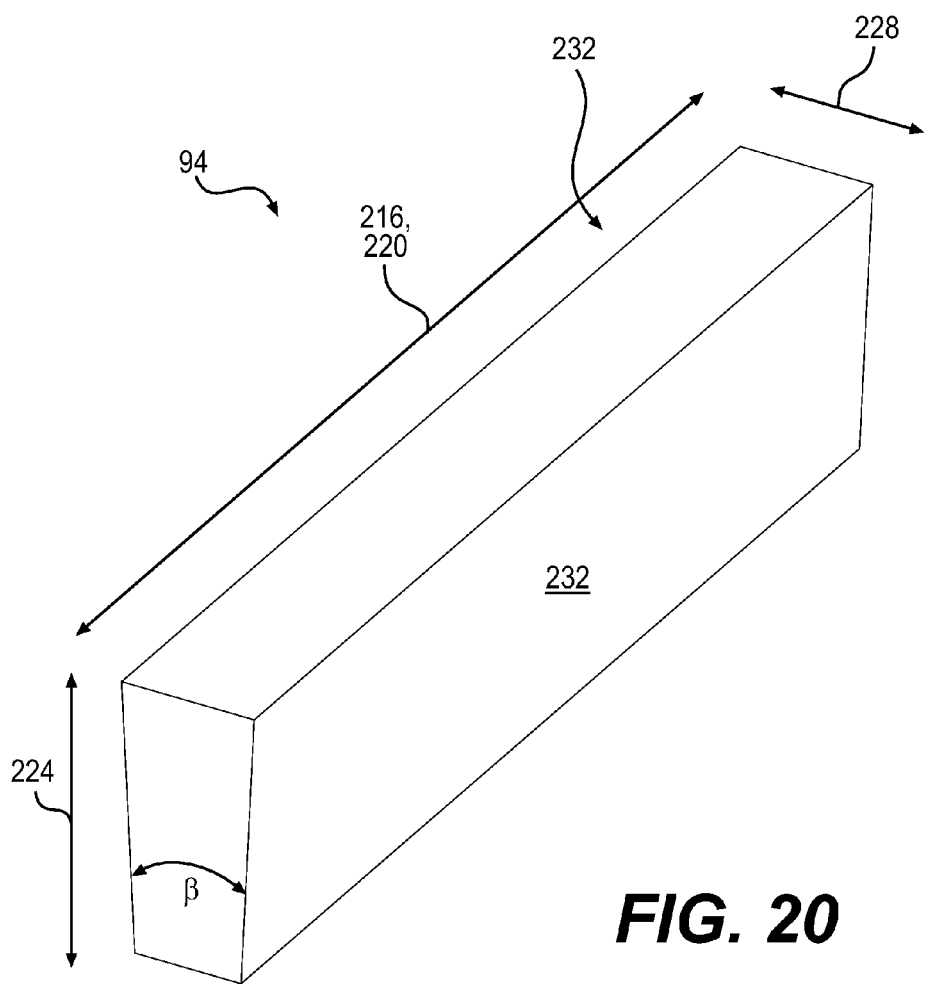
FIG. 20 is an isometric view of a magnet in accordance with at least one embodiment of the invention.

A concentrator 98 made of soft magnetic material is illustrated in FIG. 19. The concentrator 98 embodied in the present invention includes two (2) recessed portions 200 adapted to accommodate the belt 142 identified above. Concentrators have an axial length 204, a radial height 208 and a width 212 sized and designed to meet the performance criterion of the TFEM 10. Different concentrator's 98 proportions are contemplated in the scope of the present invention. The axial length 216 without the recessed portions 200 is generally of the same length as the magnets 94 that is going to be illustrated in FIG. 20, to prevent, inter alia, to contact the belt 142 that is preferably only contacting the concentrators 98. In turn, FIG. 20 depicts a typical magnet 94 that has an axial length 220, a radial height 224 and a width 228. The magnet 94 typically has two angled β sides 232 adapted to cooperate with the sidewalls of the adjacent concentrators 98 given the radial distribution of the concentrators 98 leaving a "V" shaped gap therebetween.

One of the significant aspects of the rotor portion 18 assembly is the positioning of the concentrators 98 and the magnets 94. The concentrators 98 are of significant influence because they are installed first on the cylindrical frame 122. As mentioned above the concentrators 98 of embodiments of the invention are secured with an adhesive and their respective positioning has to be standardized to prevent too many discrepancies between them that would jeopardize the global assembly. The concentrators 98 need to be axially aligned with the rotation axis 22 and at substantially the same radial distance from the rotation axis 22. One possible way to achieve that is to clean and prepare the surfaces of the cylindrical frame 122 and the concentrators 98 prior to apply adhesive on the cylindrical frame 122. A concentrator-receiving jig, hereinbelow referred to as a jig 240, adapted to position a row of three (3) concentrators 98 is illustrated in FIG. 21 and FIG. 22—we have a row of three (3) concentrators 98 because the illustrative embodiment is a three (3) phase TFEM 10, one concentrator 98 per phase.

Figure 21:
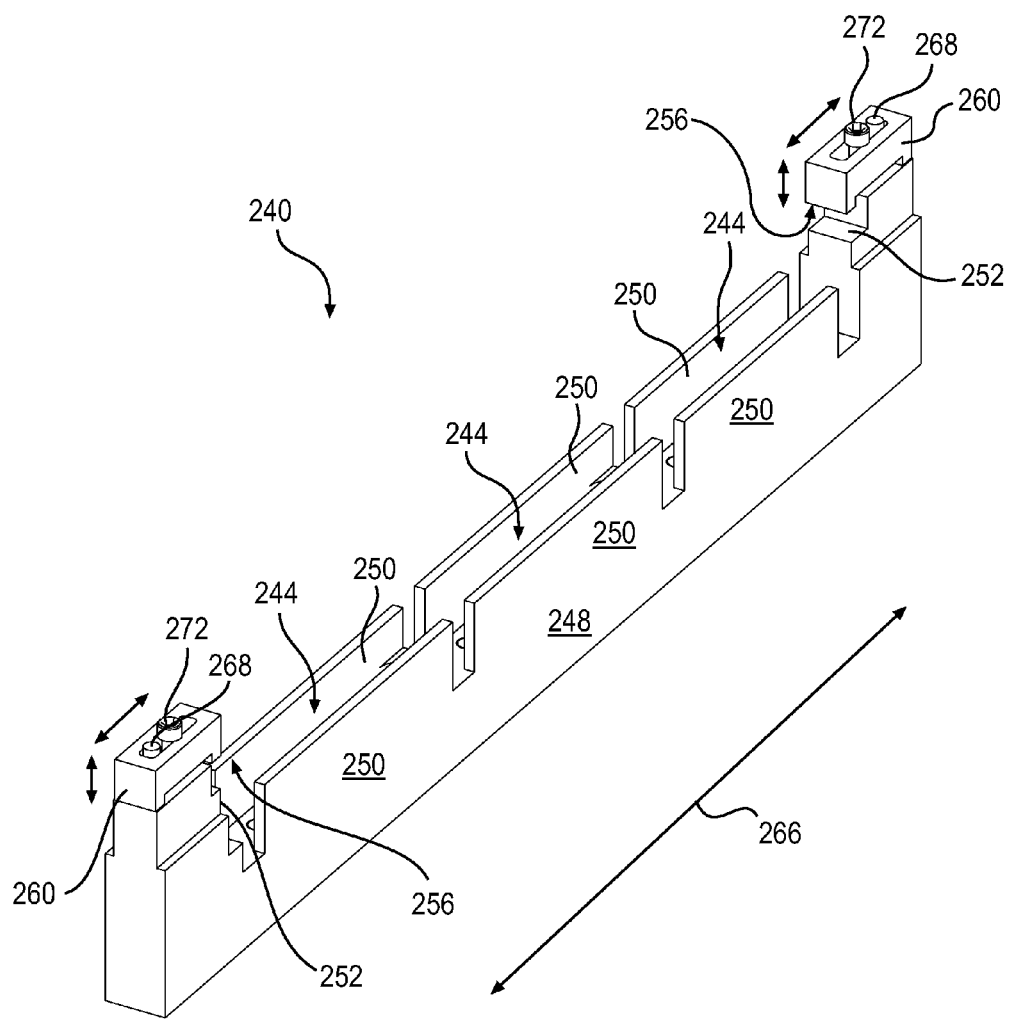
FIG. 21 is an isometric view of a concentrator support in accordance with at least one embodiment of the invention.

The jig 240 illustrated in FIG. 21 has three (3) concentrator-receiving space portions 244 included in a frame 248, illustratively embodied as a recess, and to properly interact and simultaneously secure three (3) concentrators 98 on the cylindrical frame 122—that is the base of a three (3) phases rotor portion 18. The concentrator-receiving spaces 244 are equidistantly disposed in this embodiment of the frame 248 and laterally bordered by two opposed wall portions 250 to locate the concentrators 98 in their respective concentrator-receiving space 244. The frame 248 uses the cylindrical frame 122 as a reference and includes axial concentrator-referencing-portions, hereinbelow referred to as a first pair of reference surfaces 252, adapted to contact and/or abut the exterior of the cylindrical frame 122 and a second pair of reference surfaces 256 opposed to the first pair of reference surfaces 252 adapted to contact the interior surface of the cylindrical frame 122. The second pair of reference surfaces 256 is located on an adjustable member 260 adapted to be tighten toward the first pair of reference surfaces 252 to secure the frame 248 to the cylindrical frame 122 hence locating the concentrators 98 contained therein. Each adjustable member 260 is guided in an axial direction 266 by a dowel pin 268 and a fastener 272 to ensure the adjustable member 260 remains aligned in the axial direction 266 while allowing some adjustment in this direction. The fastener 272 serves to secure the jig 240 to the cylindrical frame 122 once the jig 240 is properly located in respect with a series of adjacent and parallel slots 264 (or concentrator-receiving element) disposed on the cylindrical frame 122. The slots 264 are means to angularly locate the concentrators 98 on the cylindrical frame 122 so that the concentrators are equidistantly disposed on the cylindrical frame 122 about the rotation axis 22. One can appreciate from FIG. 18 that the slots 264 are creating intervening ridges 268 used to angularly space apart adjacent concentrators 98. The diameter of the cylindrical frame 122 and the depth of the slots 264 are sized and designed to correctly radially locate each concentrator 98, with an adequate intervening adhesive 150, to obtain the desired end diameter to engage the stator portion 14 and obtain the desired airgap 126 therebetween.

Figure 22:
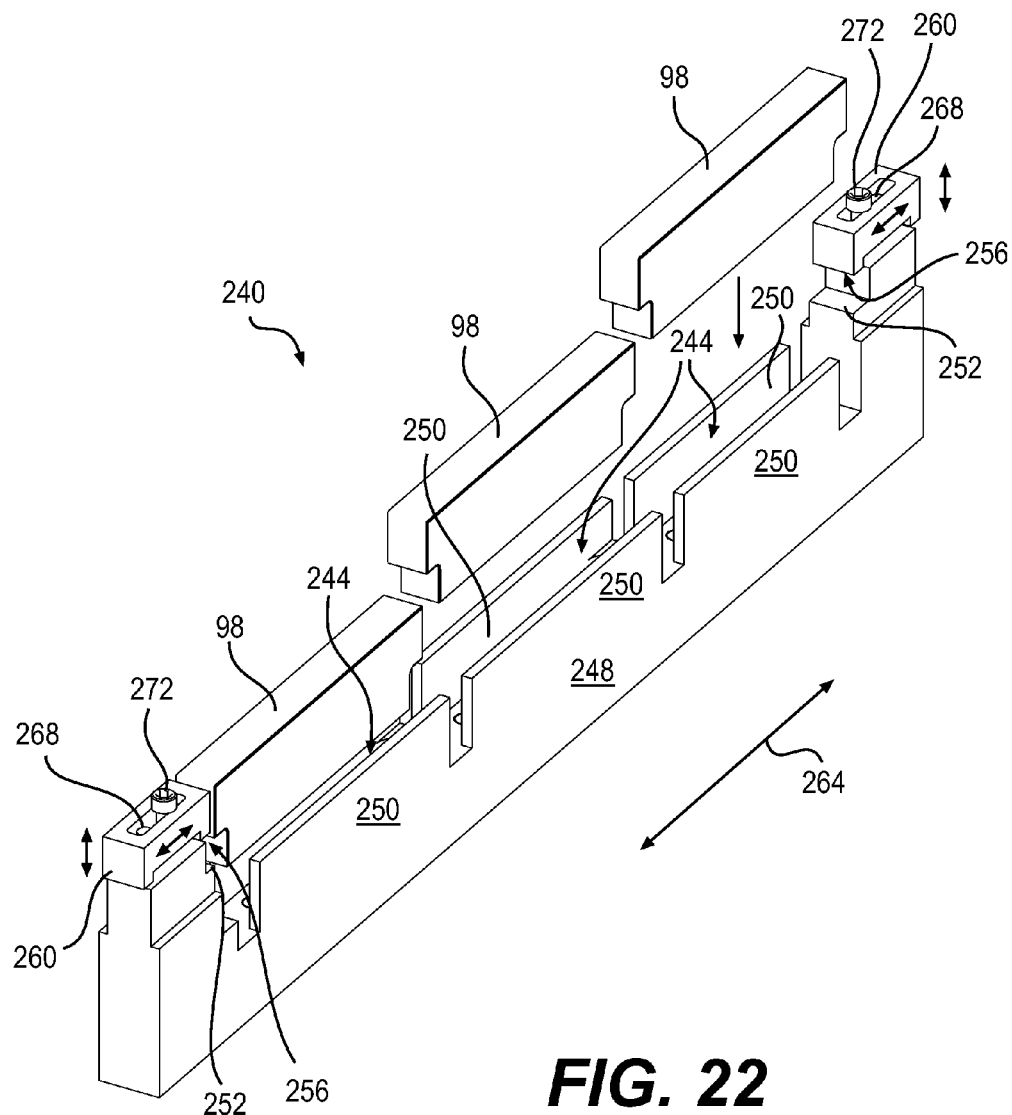
FIG. 22 is an isometric view of a concentrator support in accordance with at least one embodiment of the invention.
Figure 23:
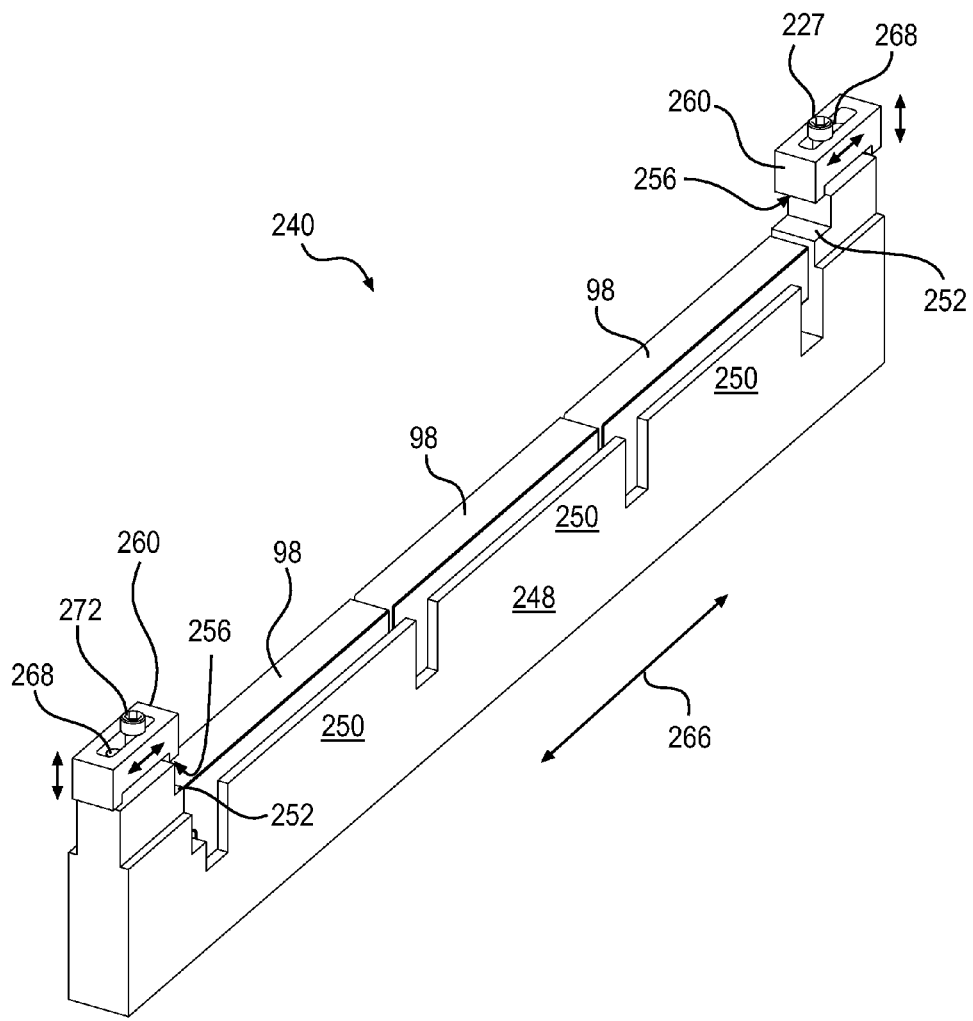
FIG. 23 is an isometric view of a concentrator support in accordance with at least one embodiment of the invention.
Figure 24:
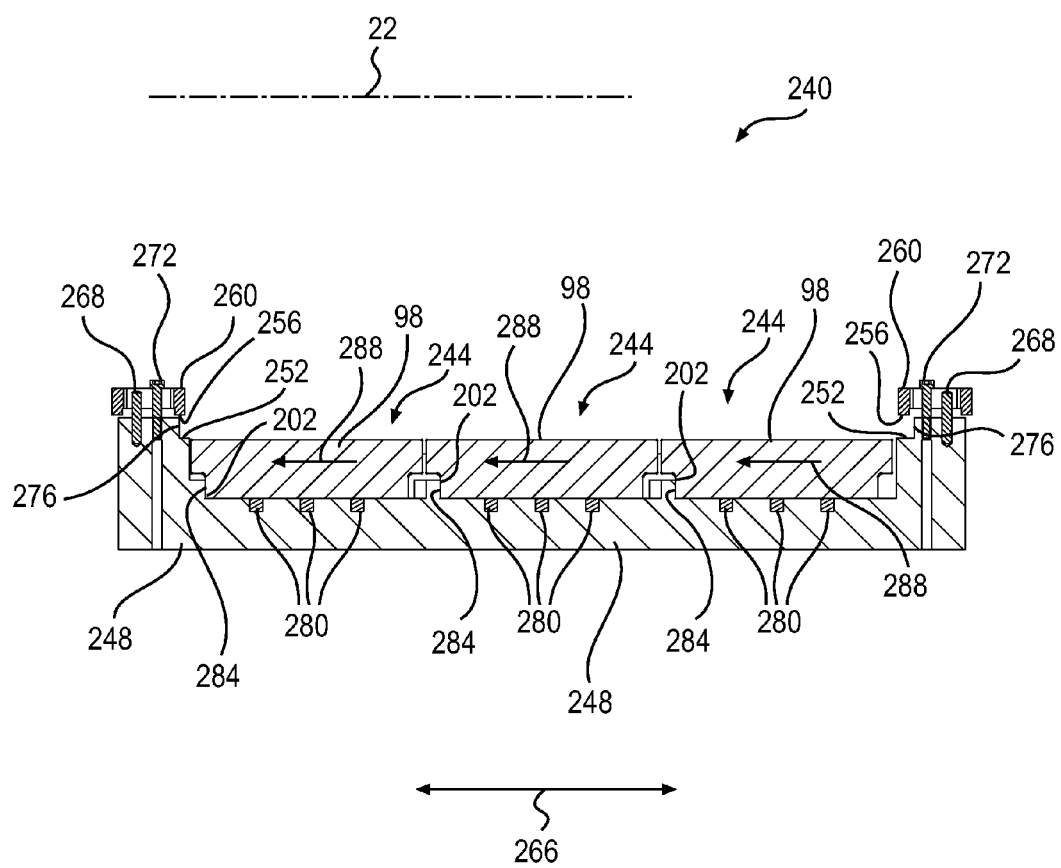
FIG. 24 is an isometric view of a concentrator support in accordance with at least one embodiment of the invention.

FIG. 22 illustrate a first step of assembling the concentrators 98 inside their respective concentrator receiving space 244 by inserting each concentrator 98 between the wall portions 250. FIG. 23 illustrate the jig 240 with three concentrators 98 assembled in the three concentrator-receiving spaces 244. Moving now to FIG. 24 depicting a section view of a jig 240 with three concentrators 98 disposed therein. One can clearly appreciate the first pair of reference surface 252 and the second pair of reference surface 256 adapted to radially locate and secure the jig 240 to the cylindrical frame 122 as explained above. A further axial pair of reference surfaces 276 is illustrated and is used to axially locate the jig 240 on the cylindrical frame 122, as it will be seen in FIG. 24. Remaining with FIG. 23, one can appreciate a plurality of magnets 280 press-fitted in the frame 248 of the jig 240 to hold each concentrator 98 in their respective concentrator-receiving spaces 244. This is one illustrative way to temporarily secure the concentrators 98 in their respective concentrator-receiving space 244 that is convenient because the jig 240 can simply be removed from the cylindrical frame 122 once the concentrators 98 are secured to the cylindrical frame 122 when the adhesive 150 between the concentrators 98 and the cylindrical frame 122 is cured. One additional feature can be appreciated from FIG. 24. An axial reference edge 284 is defined in the jig 240 for axially locating each concentrator 98. The axial positioning of each concentrator 98 is thus made by inserting a concentrator 98 in its concentrator-receiving space 244, that is axially longer than the actual axial length of a concentrator 98, and moving the concentrator 98 in the axial direction 288 to abut a wall portion 202 of the recessed portion 200 of the concentrator 98 to the axial reference edge 284. This way, each concentrator 98 is axially referenced on the same axial side to ensure consistent location of the concentrators 98.

Figure 25:
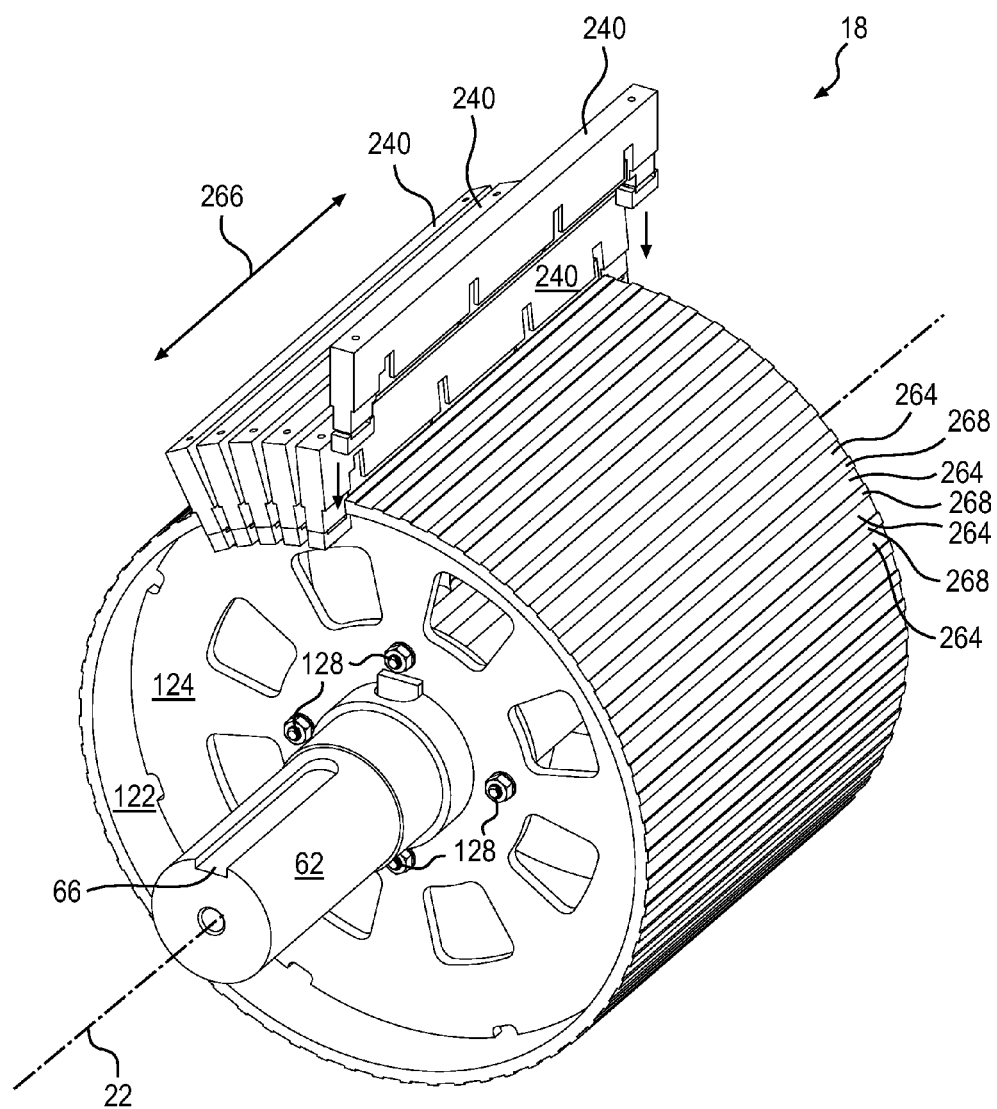
FIG. 25 is an isometric view of concentrator supports in conjunction with a rotor element in accordance with at least one embodiment of the invention.
Figure 26:
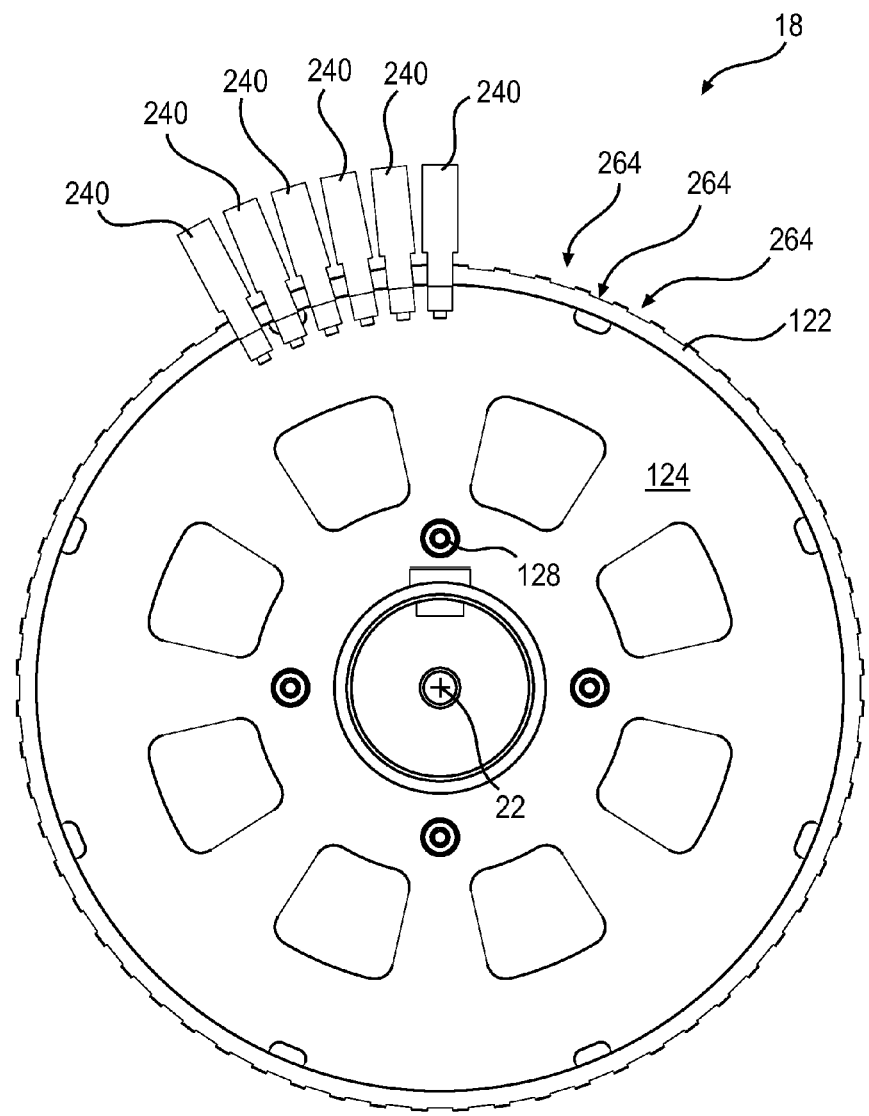
FIG. 26 is a front elevation view of concentrator supports in conjunction with a rotor element in accordance with at least one embodiment of the invention.
Figure 27:
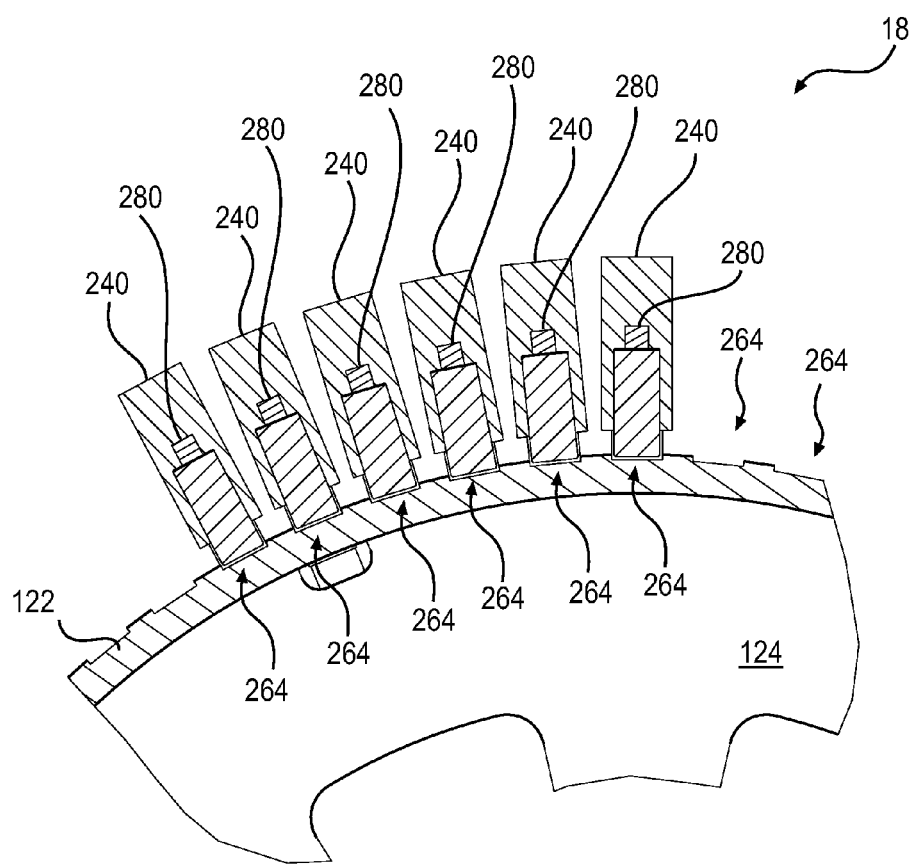
FIG. 27 is a sectional front elevation view of concentrator supports in conjunction with a rotor element in accordance with at least one embodiment of the invention.

A cylindrical frame 122 is depicted in FIG. 25 through FIG. 27. The cylindrical frame 122 is illustrated with a plurality of jigs 240 assembled thereon. A single jig 240 or a plurality of jig 240 can be simultaneously assembled to the cylindrical frame 122. The area covered by adhesive 150 can be a factor influencing the number of jig 240 to be installed simultaneously to prevent curing adhesive in slots 264 where there is no concentrators 98.

Figure 28:
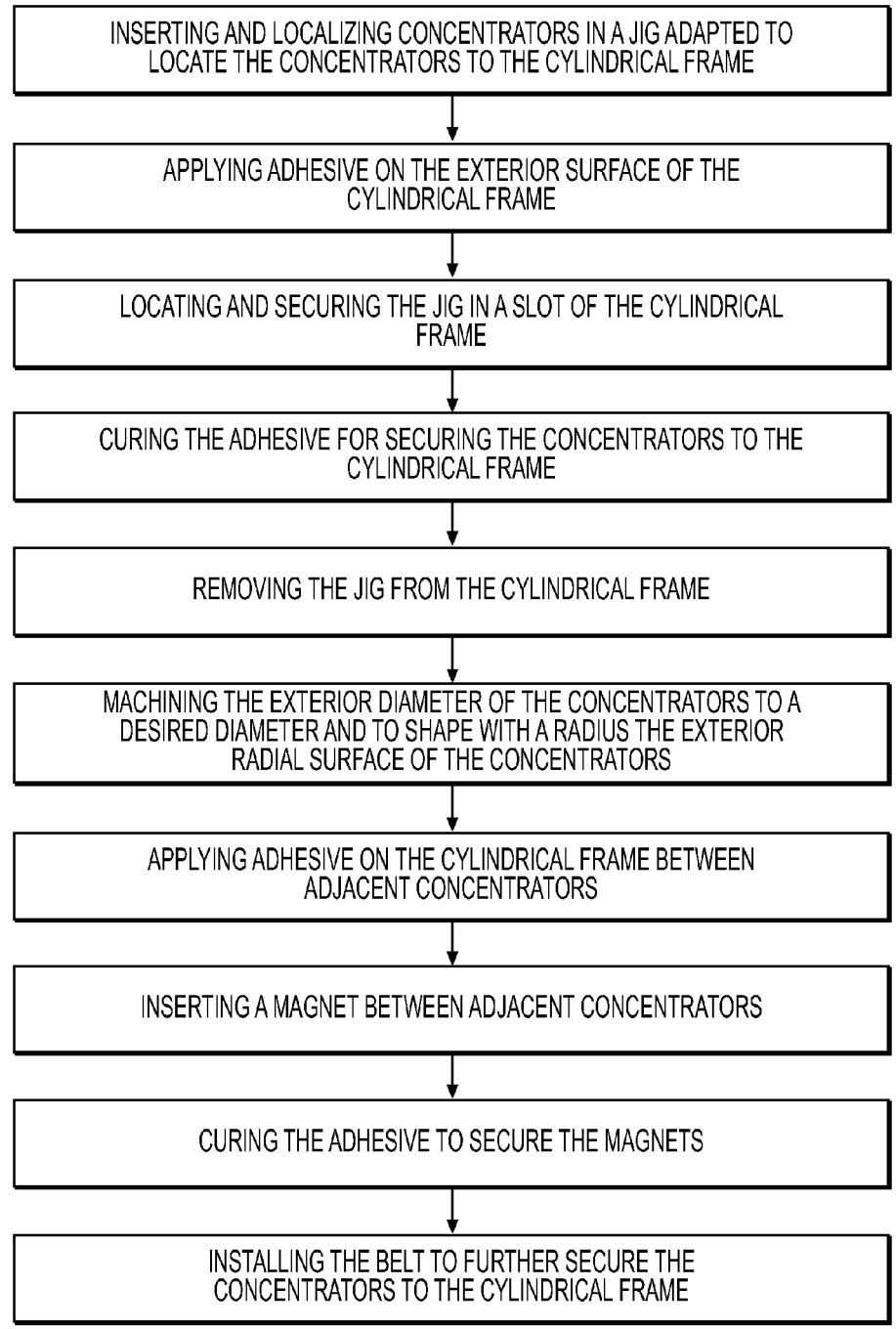
FIG. 28 is an exemplary flow chart of steps for assembling concentrators on a rotor assembly in accordance with at least one embodiment of the invention.

FIG. 28 illustrates an illustrative series of steps that can be used to assemble the magnets 94 and the concentrators 98 to the cylindrical frame 122.

Figure 29:
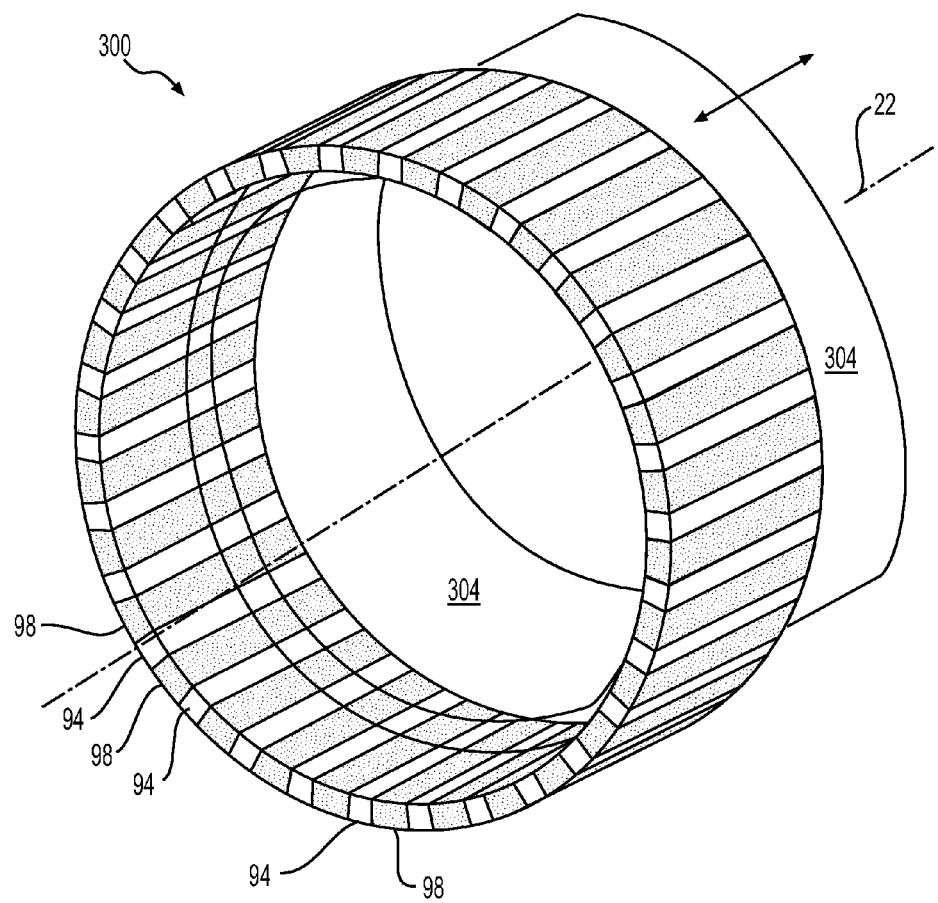
FIG. 29 is an isometric view of a schematic layout of magnets and concentrators for an external rotor portion in accordance with at least one embodiment of the invention.
Figure 30:
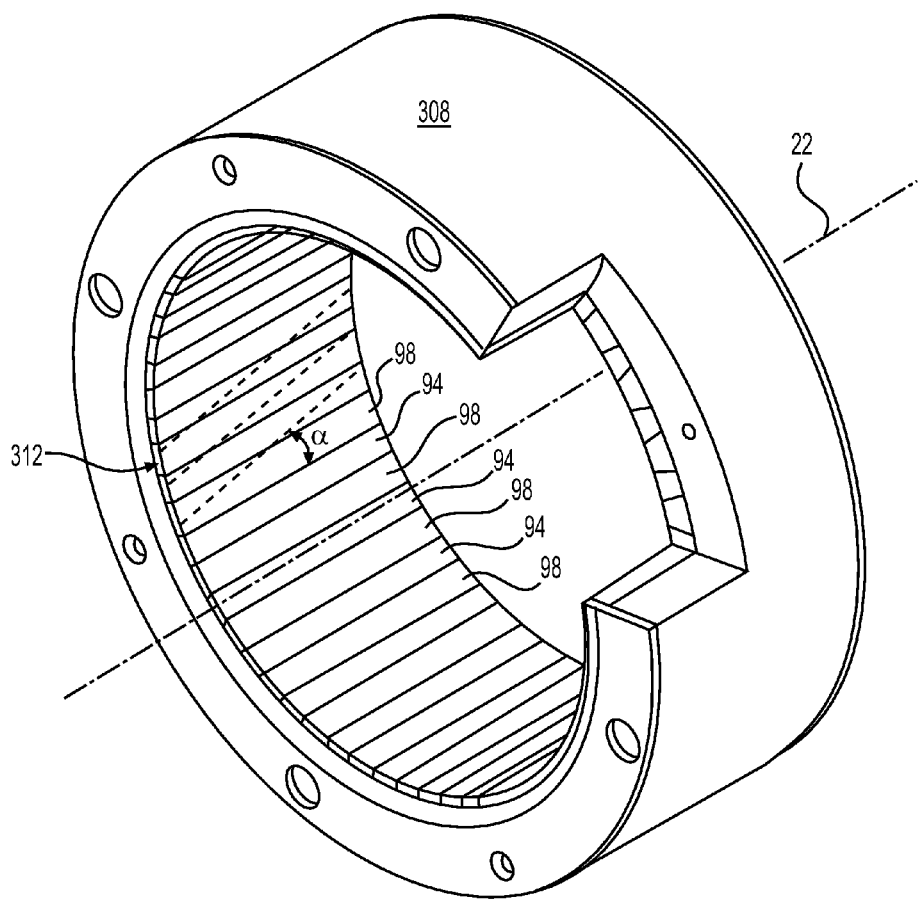
FIG. 30 is an isometric view of a schematic layout of magnets and concentrators for an external rotor portion in accordance with at least one embodiment of the invention.

The previous embodiments illustrated an internal rotor portion 18 intended to operate in conjunction with an external stator portion 14. The internal rotor portion 18 is adapted to rotate inside the stator portion 14. One could appreciate from the figures that the external stator portion 14 has a significant radial thickness on the distal side of the airgap. An external rotor portion 300 can be desirable when the overall external diameter of the TFEM 10 should be kept to a minimum because the radial thickness of the rotor portion 300 is generally smaller than the radial thickness of the stator portion 14. For instance, generators and motors applications like an electric wheel-motor, windmills where blades are connected to the external rotor, and fans where blades are connected to the external rotor portion 300. An example is schematically illustrated in FIGS. 29 and 30. One can appreciate the external rotor 300 has also an alternate series of magnets 94 and concentrators 98. The magnets 94 and concentrators 98 are temporarily mounted on a cylindrical support 304 prior to be inserted and secured in an external frame 308. The cylindrical support 304 is adapted to locate and maintain the magnets 94 and concentrators 98 to ensure proper positioning inside the external frame 308. Once the magnets 94 and concentrators 98 are properly positioned on the cylindrical support 304 the assembly is optionally machined to ensure a cylindrical exterior shape with proper diameter. Then the cylindrical support 304 with the magnets 94 and the concentrators 98 are axially slided in the external frame 308. The interior wall portion of the external frame 308 is coated with an adhesive prior to receive the magnets 94 and concentrators 98 assembly to permanently secure the magnets 94 and concentrators 98 properly in place in an operating configuration inside the external frame 308.

Once the adhesive has cured and the magnets 94 and the concentrators 98 are firmly secured inside the external frame 308, the external rotor 300 assembly is machined to bring the internal diameter of the magnets 94 and concentrators 98 to a desired dimension to ensure proper radius of the radially proximal surfaces of the magnets 94 and concentrators 98 and also ensure the airgap between the stator portion 14 (not illustrated in FIGS. 29, 30) and the rotor portion 300 is optimal. Alternatively, the magnets 94 and concentrators 98 are secured by resin injection in the external frame 308.

The external rotor 300 can accommodate thereon a plurality of skewed 312 magnets 94 and concentrators 98 in respect with the rotation axis 22 of the rotor portion 28, 300. Skewed 312, or angled magnets 94 and concentrators 98, allows a more progressive interaction between the magnets 94 and concentrators 98 and the cooperating cores in the stator portion 14.

Figure 31:
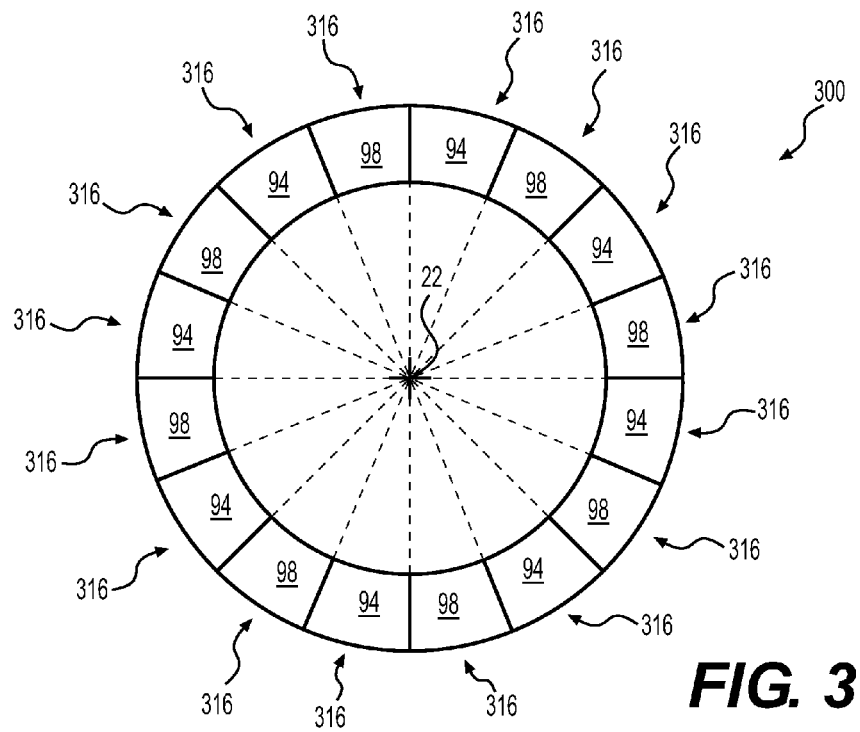
FIG. 31 is a schematic front elevation view of a series of magnets and concentrators in accordance with at least one embodiment of the invention.
Figure 32:
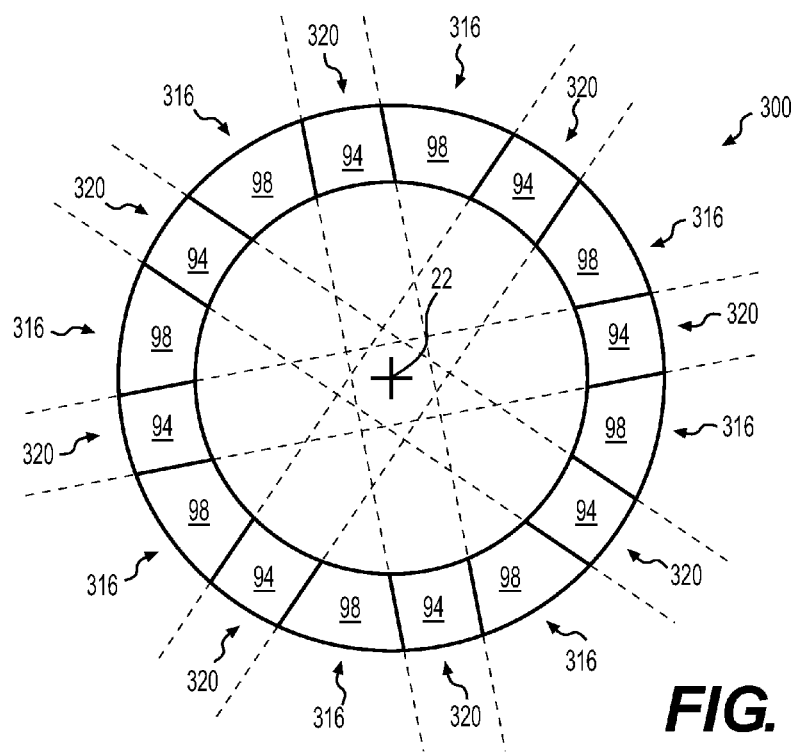
FIG. 32 is a schematic front elevation view of a series of magnets and concentrators in accordance with at least one embodiment of the invention.

Moreover, the shape of the magnets 94 and concentrators 98 that cooperates together can all be the same as schematically illustrated in FIG. 31. The magnets 94 and concentrators 98 all have a "keystone" trapezoidal shape. The keystone shape 316 helps mechanically self locate and support the magnets 94 and concentrators 98 in the rotor 300. Conversely, as schematically illustrated in FIG. 32, because the magnets material is generally more difficult to machine, or alter, and because the magnet material is expensive, the shape of the magnets 94 can be more standard, like rectangular, and the shape of the concentrators 98 is a more pronounced "keystone" shape adapted to take on the remaining space of the straight magnets 94. The self-locating and self-supporting keystone effect is thus realized by shaping in keystone shape only the concentrators 98. This is one way to use less magnet material and reduce the cost of the TFEM 10.

Figure 33:
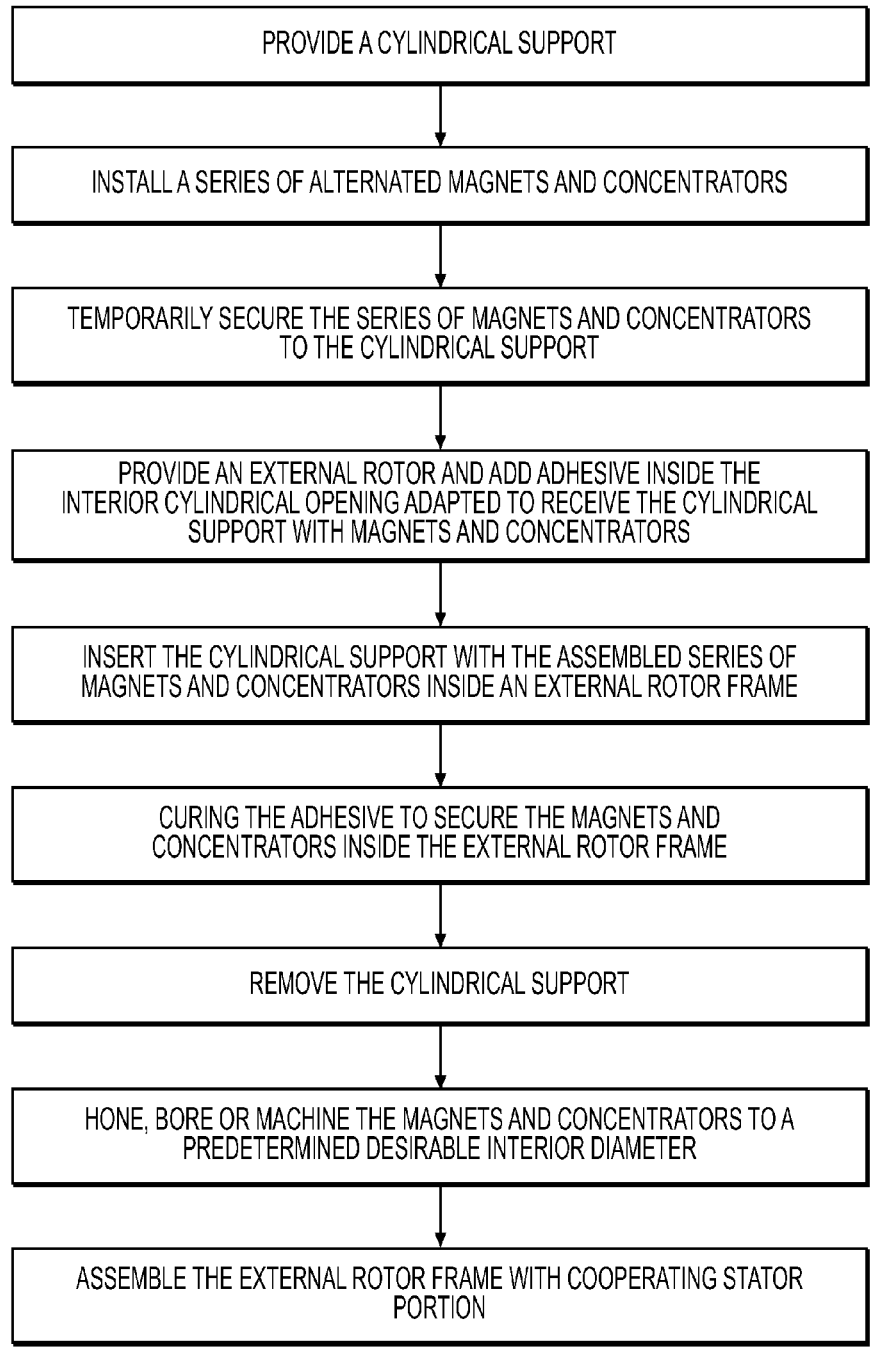
FIG. 33 is an exemplary series of steps for assembling an external stator.

FIG. 33 illustrates an exemplary series of steps that can be used to assemble the magnets 94 and the concentrators 98 to the external rotor 300.

The description and the drawings that are presented above are meant to be illustrative of the present invention. They are not meant to be limiting of the scope of the present invention. Modifications to the embodiments described may be made without departing from the present invention, the scope of which is defined by the following claims.

What is claimed is:

1. A method of assembling a rotor portion adapted to be used in a rotatable transverse flux electrical machine (TFEM), the method comprising:
   a) assembling at least one concentrator to a concentrator-receiving jig;
   b) applying bonding material between the concentrator and a magnet-and-concentrator supporting frame;
   c) assembling the concentrator-receiving jig to the magnet-and-concentrator supporting frame wherein a radial reference portion of the concentrator-receiving jig is material to set a distance between the concentrator assembled to the concentrator-receiving jig and the magnet-and-concentrator supporting frame;
   d) repeating steps a) to c) for all the concentrators to assemble to the magnet-and-concentrator supporting frame;
   e) curing the bonding material to secure the concentrators to the magnet-and-concentrator supporting frame; and
   f) removing the concentrator-receiving jig without the at least one concentrator that remains secured to the magnet-and-concentrator supporting frame.

2. The method of claim 1, the method further comprising machining a radial-distal portion of the concentrators secured to the magnet-and-concentrator supporting frame to obtain a desired rotor portion outside diameter.

3. The method of claim 1, the method further comprising adding a magnet between adjacent pairs of concentrators secured to the magnet-and-concentrator supporting frame.

4. The method of claim 1, the method further comprising longitudinally locating the concentrator-receiving jig by abutting an axial jig-referencing-portion of the concentrator-receiving jig to the magnet-and-concentrator supporting frame.

5. The method of claim 1, the method further comprising longitudinally locating the at least one concentrator on the concentrator-receiving jig by abutting a longitudinal side of the at least one concentrator to an axial concentrator-referencing-portion of the concentrator-receiving jig.

6. The method of claim 1, wherein the at least one concentrator is a plurality of concentrators and the concentrator-receiving jig being adapted to simultaneously assemble a plurality of concentrators.

7. The method of claim 1, wherein the concentrator-receiving jig is adapted to be assembled to a multi-phase rotor portion.

8. The method of claim 1, the method further comprising aligning the concentrator-receiving jig with a concentrator-receiving portion comprised on the cylindrical frame.

9. The method of claim 1, wherein the concentrator-receiving jig comprises a magnet adapted to removably secure the at least one concentrator to the concentrator-receiving jig, the method further comprising magnetically securing the at least one concentrator to the concentrator-receiving jig.

10. The method of claim 1, wherein the concentrator-receiving jig comprises a concentrator-receiving recess, the method further comprising laterally locating the at least one concentrator to the concentrator-receiving jig by inserting the at least one concentrator in the concentrator-receiving recess.

11. A method of assembling concentrators and magnets on a magnets-and-concentrators supporting member, the method comprising:
   locating the concentrators on the magnets-and-concentrators supporting frame; and
   bonding the concentrators on the magnets-and-concentrators supporting frame.

12. The method of claim 11, the method further comprising machining an exterior diameter of the concentrators.

13. The method of claim 11, the method further comprising adding a magnet between adjacent pairs of concentrators on the magnets-and-concentrators supporting frame.

14. The method of claim 11, the method further comprising machining the exterior diameter of the concentrators on the magnets-and-concentrators supporting frame.

15. The method of claim 11, the method further comprising longitudinally locating the concentrators on a concentrator-receiving jig by abutting the concentrators to an axial concentrator-referencing-portion of the concentrator-receiving jig, the concentrator-receiving jig being positioned on the magnets-and-concentrators supporting frame to further locate the concentrators.

16. The method of claim 11, the method further comprising aligning the concentrators with concentrator-receiving portions comprised on the magnets-and-concentrators supporting frame.

17. The method of claim 11, wherein magnetism is material for temporarily positioning the concentrators in respect with the magnets-and-concentrators supporting frame.

* * * * *